United States Patent
Kim et al.

(10) Patent No.: US 10,536,058 B2
(45) Date of Patent: Jan. 14, 2020

(54) MOTOR DRIVING APPARATUS, METHOD FOR CONTROLLING MOTOR DRIVING APPARATUS, INVERTER APPARATUS, AND POWER APPARATUS

(71) Applicant: Samsung Electronics Co., Ltd., Suwon-si, Gyeonggi-do (KR)

(72) Inventors: Sun Jin Kim, Suwon-si (KR); Hyun Soo Park, Seoul (KR); Sang Cheol Moon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 11 days.

(21) Appl. No.: 15/763,659

(22) PCT Filed: Aug. 23, 2016

(86) PCT No.: PCT/KR2016/009328
§ 371 (c)(1),
(2) Date: Mar. 27, 2018

(87) PCT Pub. No.: WO2017/061693
PCT Pub. Date: Apr. 13, 2017

(65) Prior Publication Data
US 2018/0287466 A1 Oct. 4, 2018

(30) Foreign Application Priority Data
Oct. 5, 2015 (KR) .................. 10-2015-0139523

(51) Int. Cl.
*H02K 11/33* (2016.01)
*H02K 11/26* (2016.01)
(Continued)

(52) U.S. Cl.
CPC .......... *H02K 11/33* (2016.01); *H02H 7/0844* (2013.01); *H02K 11/26* (2016.01); *H02K 11/35* (2016.01);
(Continued)

(58) Field of Classification Search
CPC ...... H02P 1/00; H02P 1/04; H02P 1/16; H02P 1/46; H02P 3/00; H02P 6/00; H02P 6/008;
(Continued)

(56) References Cited

U.S. PATENT DOCUMENTS 5,619,111 A * 4/1997 Katagiri ................. G05B 11/32
318/105
6,194,856 B1 * 2/2001 Kobayashi ............ H02M 7/003
318/432

(Continued)

FOREIGN PATENT DOCUMENTS

EP 0 446 733 A2 9/1991
EP 2 034 812 A2 3/2009
(Continued)

OTHER PUBLICATIONS

International Search Report dated Nov. 24, 2016 in corresponding International Patent Application No. PCT/KR2016/009328.
(Continued)

*Primary Examiner* — Antony M Paul
(74) *Attorney, Agent, or Firm* — Staas & Halsey LLP

(57) ABSTRACT

A motor driving apparatus includes a first module on which an inverter circuit configured to supply a driving current to a motor is mounted, a second module on which a control circuit configured to control the inverter circuit is mounted, and a third module on which a power circuit configured to supply direct-current (DC) power to at least one of the inverter circuit and the control circuit. The first module and the second module are attachable to and detachable from the third module.

16 Claims, 31 Drawing Sheets

(51) Int. Cl.
| | |
|---|---|
| *H02K 11/35* | (2016.01) |
| *H02M 7/00* | (2006.01) |
| *H02H 7/08* | (2006.01) |
| *H02P 27/08* | (2006.01) |
| *H02M 1/00* | (2006.01) |
| *H02M 1/42* | (2007.01) |
| *H02M 1/44* | (2007.01) |
| *H02M 3/335* | (2006.01) |
| *H02M 7/06* | (2006.01) |
| *H02M 7/5387* | (2007.01) |

(52) U.S. Cl.
CPC ............ *H02M 7/003* (2013.01); *H02P 27/08* (2013.01); *H02M 1/4208* (2013.01); *H02M 1/44* (2013.01); *H02M 3/33507* (2013.01); *H02M 7/06* (2013.01); *H02M 7/53871* (2013.01); *H02M 2001/007* (2013.01)

(58) Field of Classification Search
CPC ...... H02P 6/04; H02P 6/08; H02P 6/12; H02P 6/20; H02P 11/00; H02P 21/00; H02P 21/0025; H02P 21/0032; H02P 23/00; H02P 23/0022; H02P 23/0027; H02P 23/0068; H02P 23/0081; H02P 23/065; H02P 25/00; H02P 27/00; H02P 27/04; H02P 27/06; H02P 2005/41; H02M 1/00; H02M 5/00; H02M 7/00; H02M 2001/0067
USPC ......... 318/400.01, 400.02, 400.14, 700, 701, 318/727, 800, 801, 400.12; 363/40, 44, 363/95, 175
See application file for complete search history.

(56) References Cited

U.S. PATENT DOCUMENTS

| | | | | |
|---|---|---|---|---|
| 7,035,115 | B2 * | 4/2006 | Walesa | H01R 25/164 307/147 |
| 8,400,092 | B2 * | 3/2013 | Kasunich | H02P 6/34 318/490 |
| 8,971,041 | B2 * | 3/2015 | Sharaf | H05K 7/20927 361/698 |
| 9,000,633 | B2 * | 4/2015 | Yamasaki | B62D 5/0406 310/64 |
| 9,184,640 | B2 * | 11/2015 | Morimoto | H02K 9/22 |
| 9,209,718 | B2 * | 12/2015 | Sykes | H02H 3/24 |
| 2013/0258596 | A1 | 10/2013 | Sharaf et al. | |
| 2015/0163962 | A1 | 6/2015 | Suzuki et al. | |

FOREIGN PATENT DOCUMENTS

| | | |
|---|---|---|
| EP | 2 793 540 A2 | 10/2014 |
| EP | 2 913 917 A2 | 9/2015 |
| JP | 2004-274945 | 9/2004 |
| JP | 2011-83065 | 4/2011 |
| JP | 2011-250545 | 12/2011 |
| KR | 10-2011-0073727 | 6/2011 |

OTHER PUBLICATIONS

Written Opinion of the International Searching Authority dated Nov. 24, 2016 in corresponding International Patent Application No. PCT/KR2016/009328.
Extended European Search Report dated Jul. 4, 2018 in corresponding European Patent Application No. 16853809.8.

* cited by examiner

[Fig. 1]
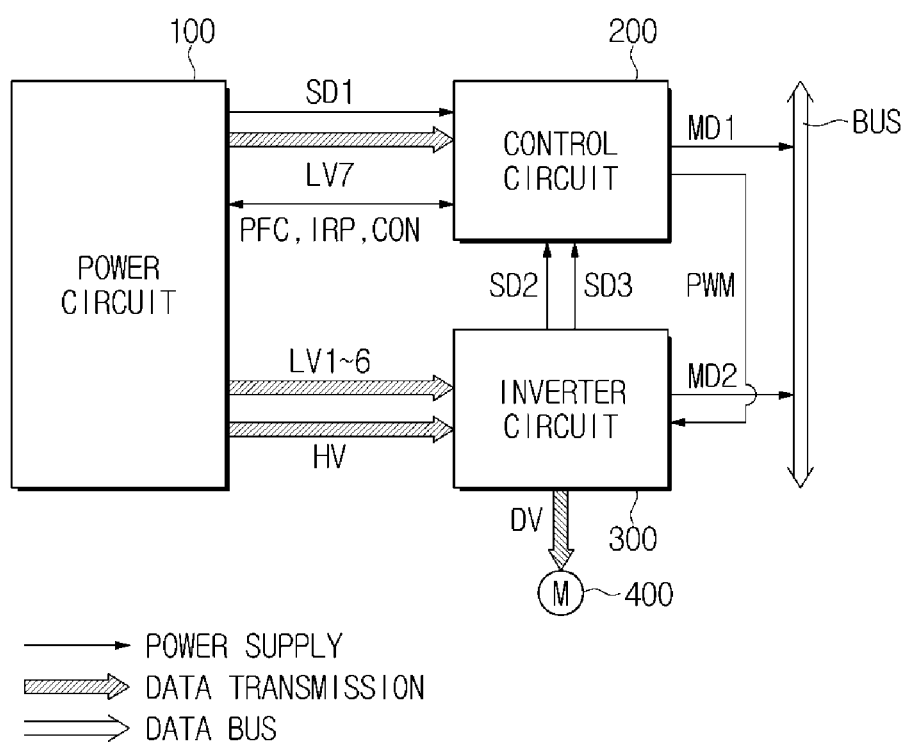

[Fig. 2]
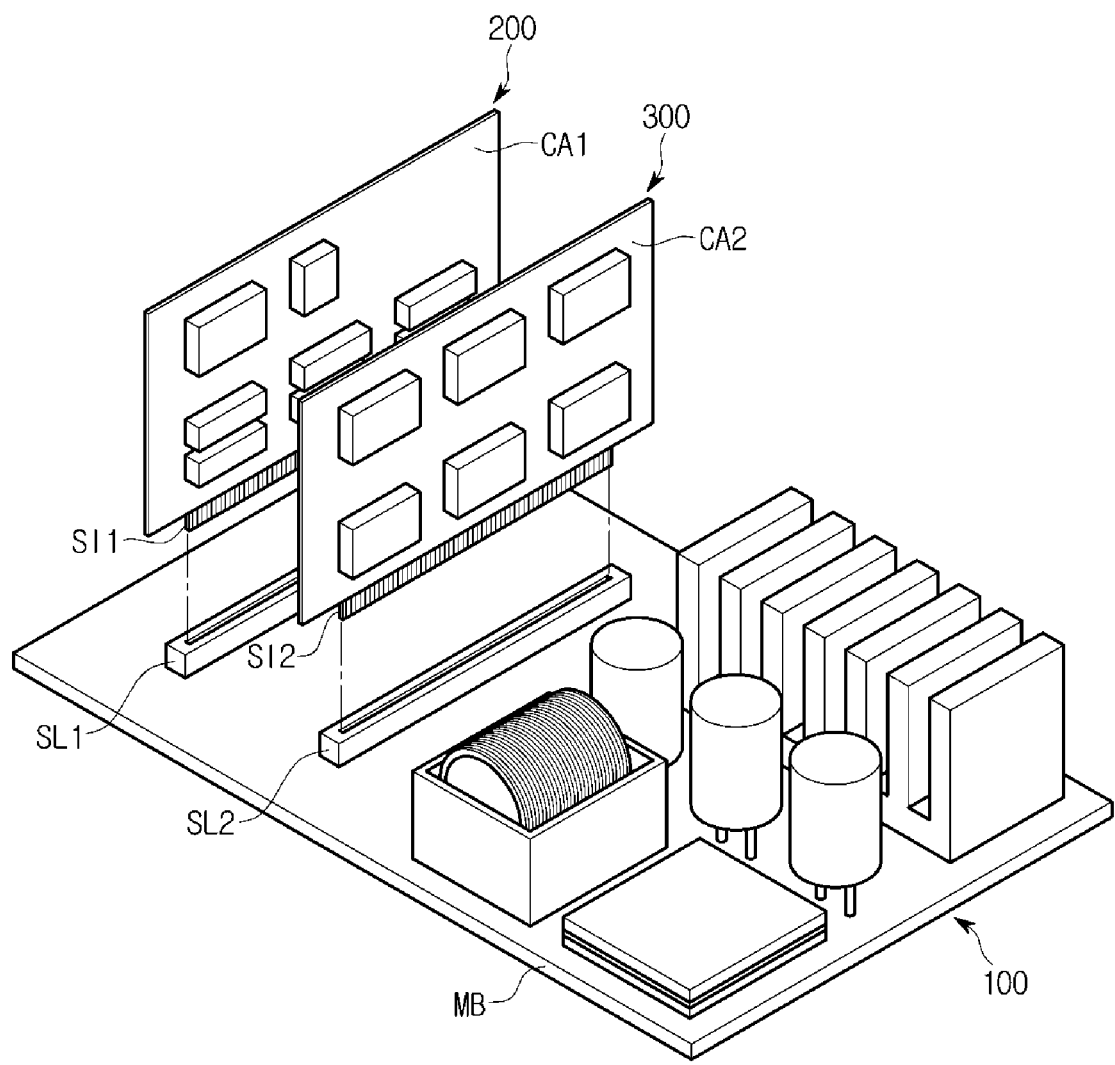

[Fig. 3]
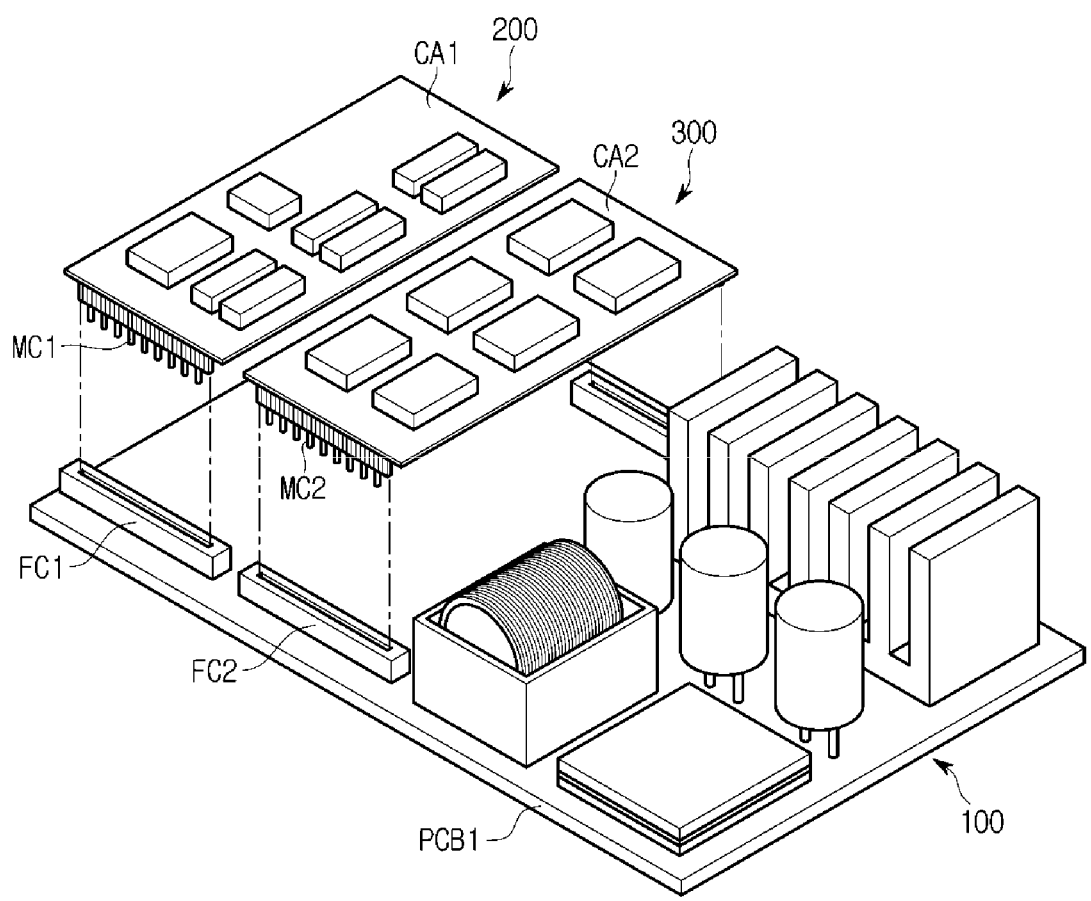

[Fig. 4]
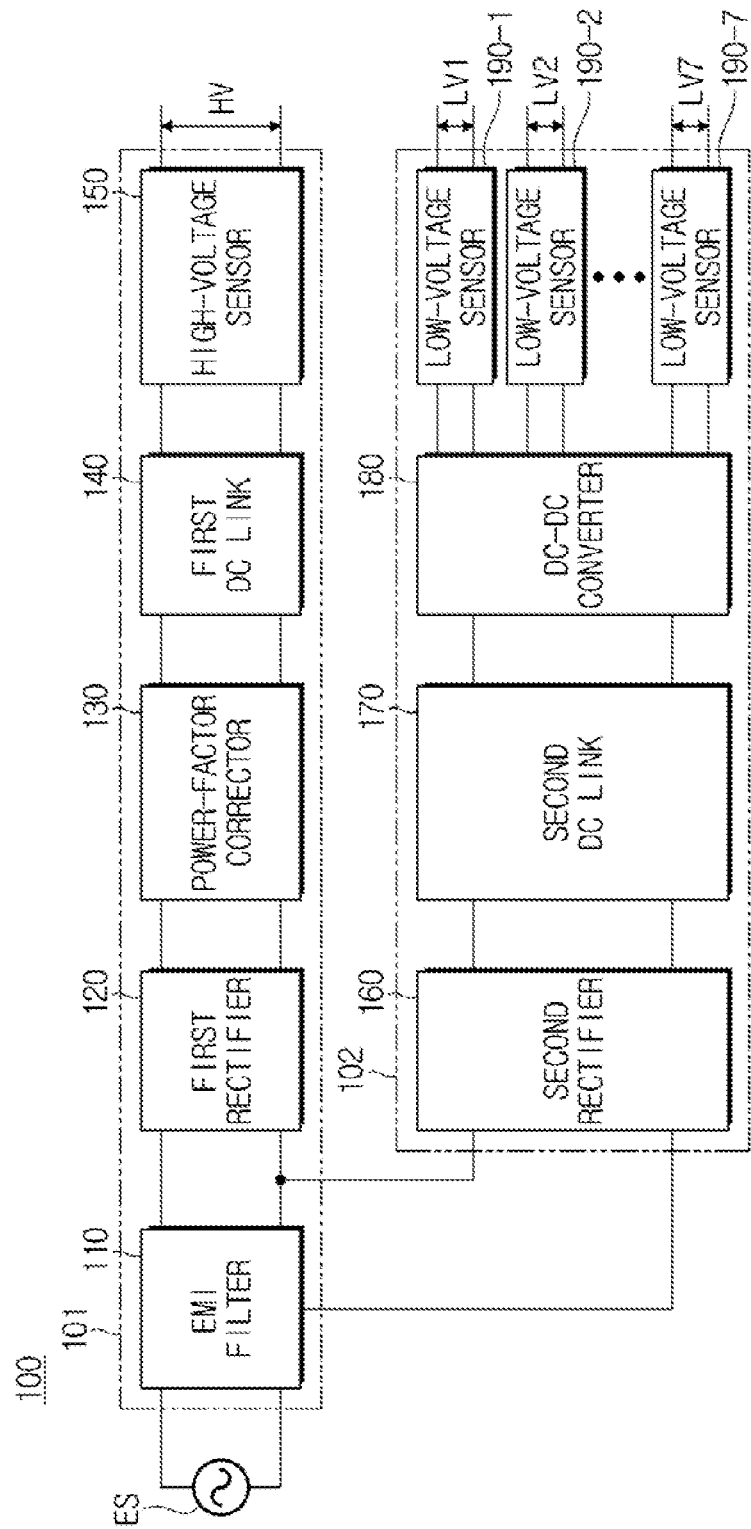

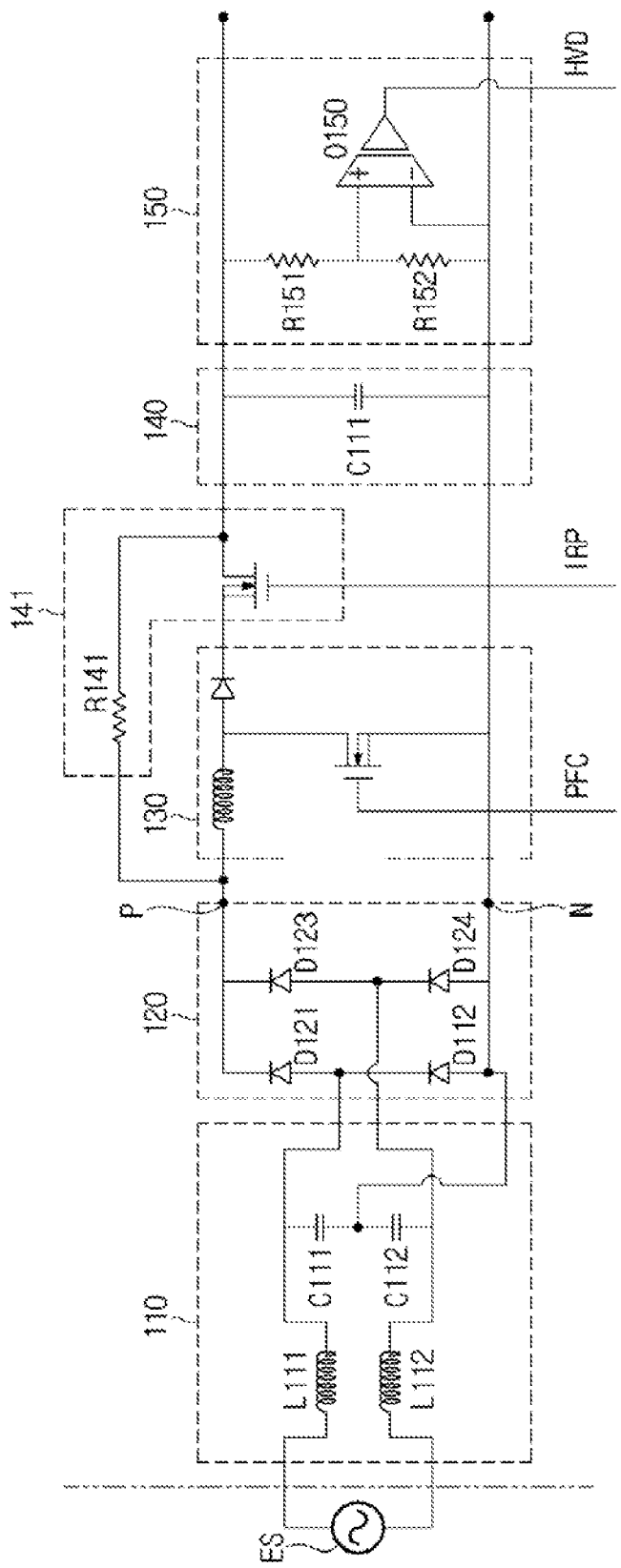
[Fig. 5]

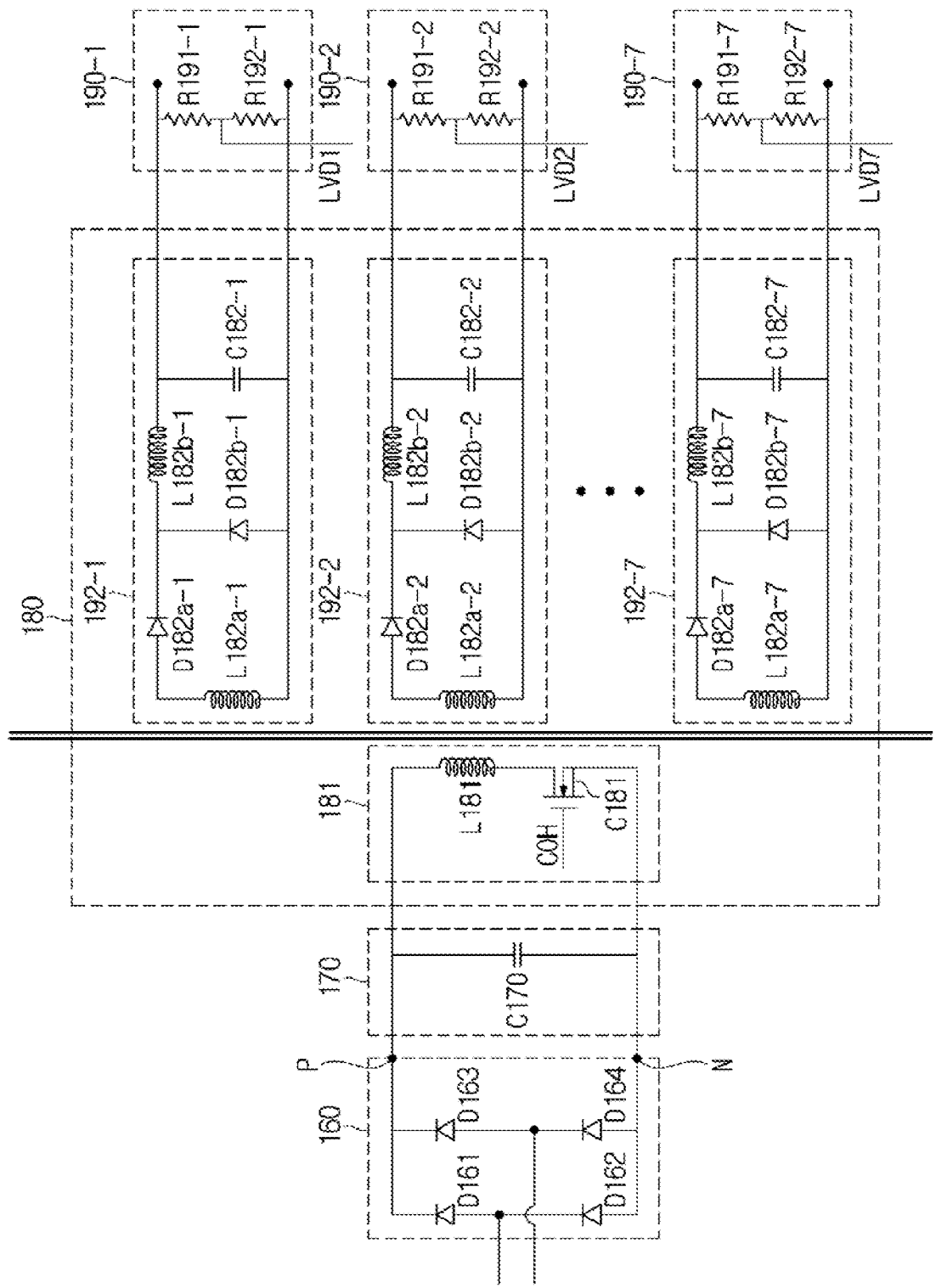
[Fig. 6]

[Fig. 7a]
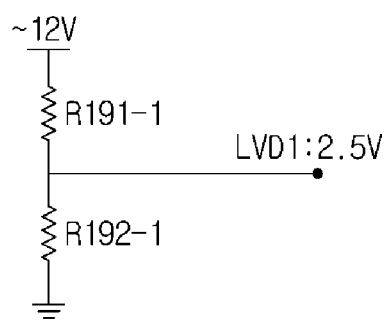

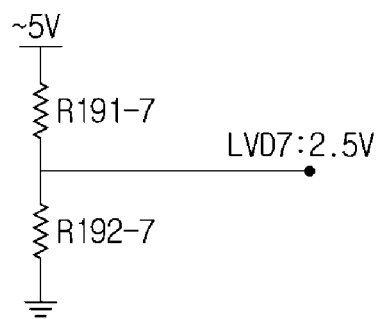
[Fig. 7b]

[Fig. 8]
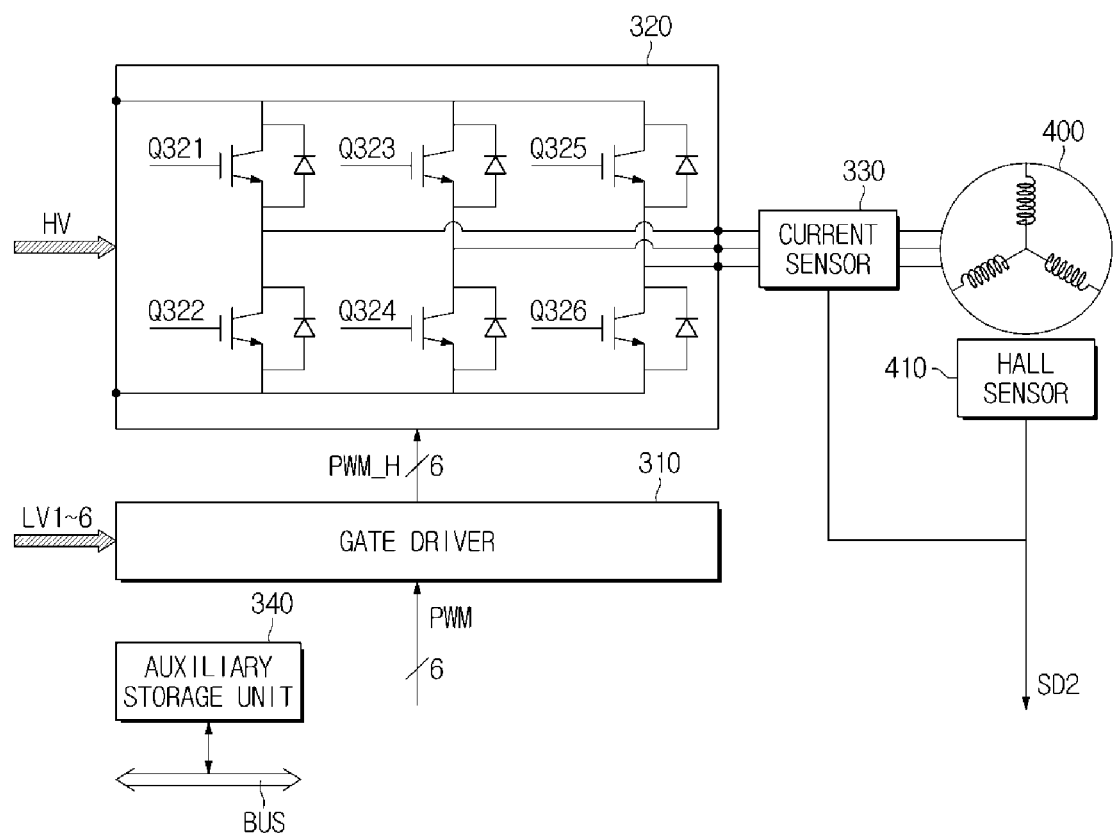

[Fig. 9]
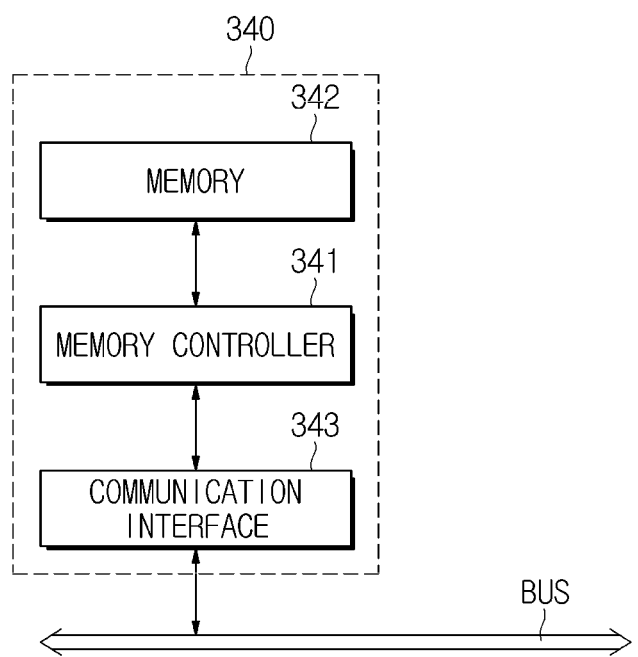

[Fig. 10]
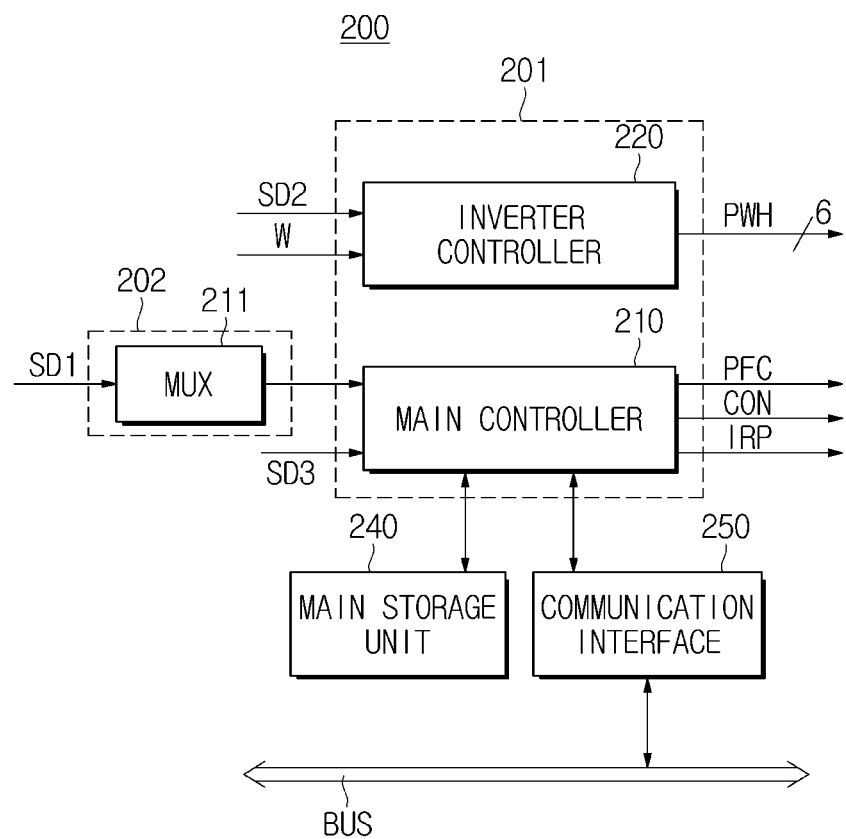

[Fig. 11]
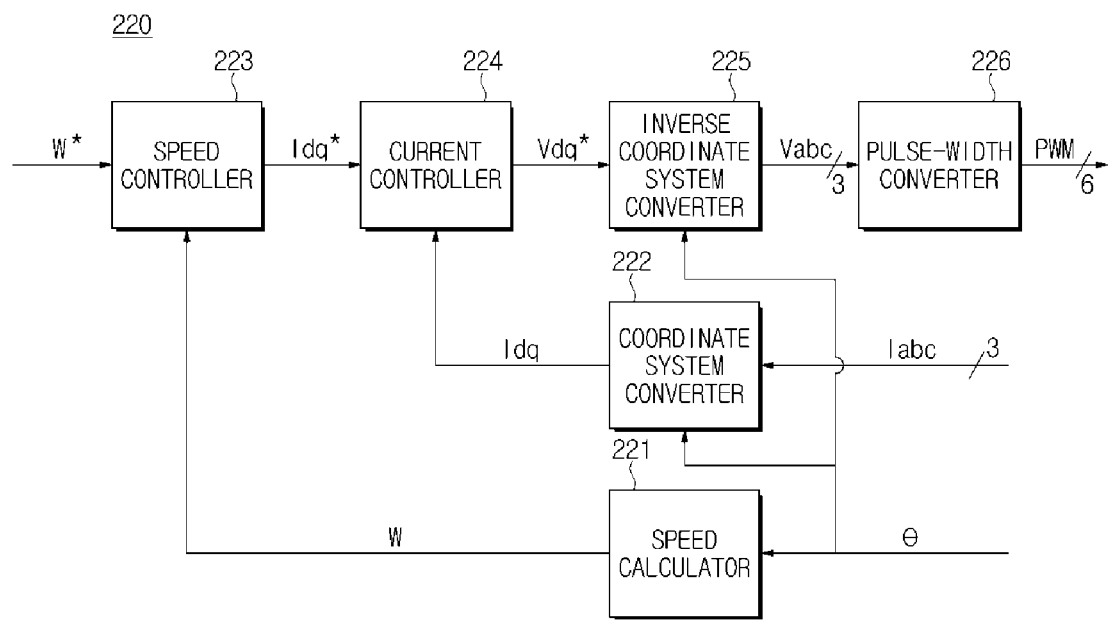

[Fig. 12]
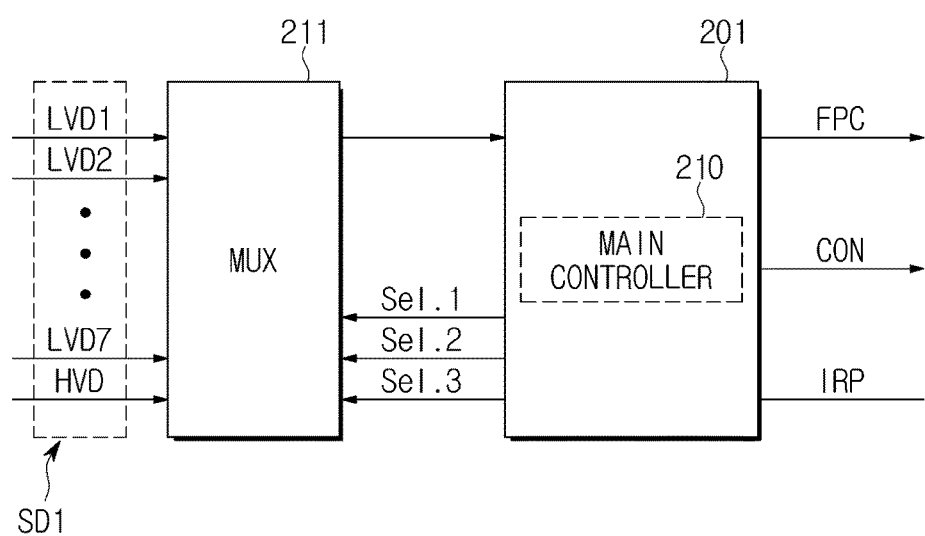

[Fig. 13]
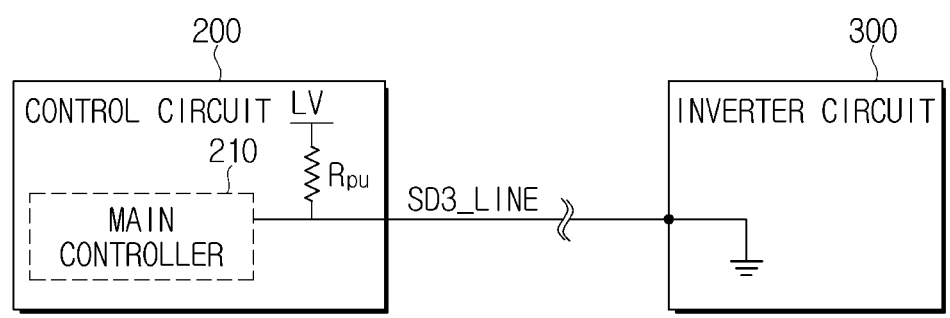

[Fig. 14]
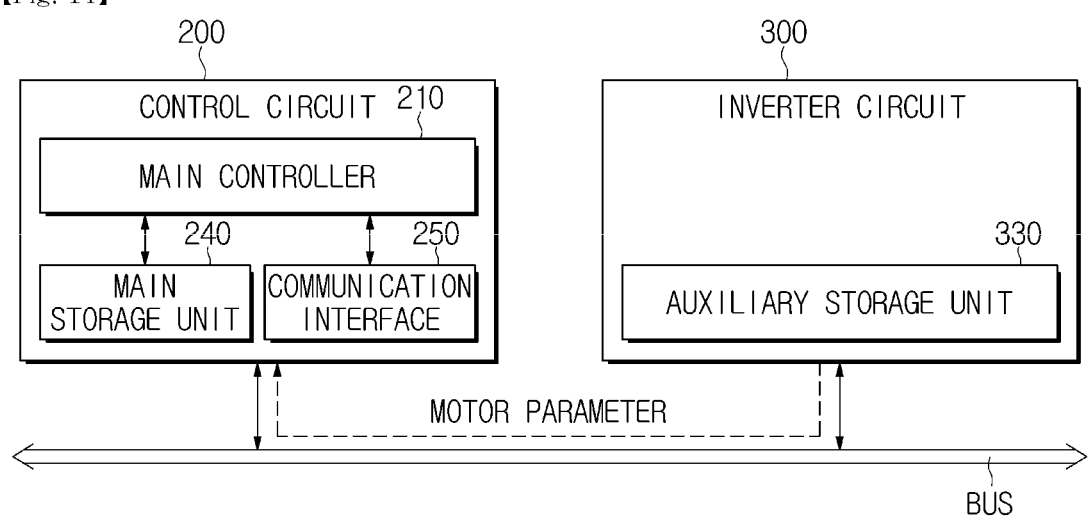

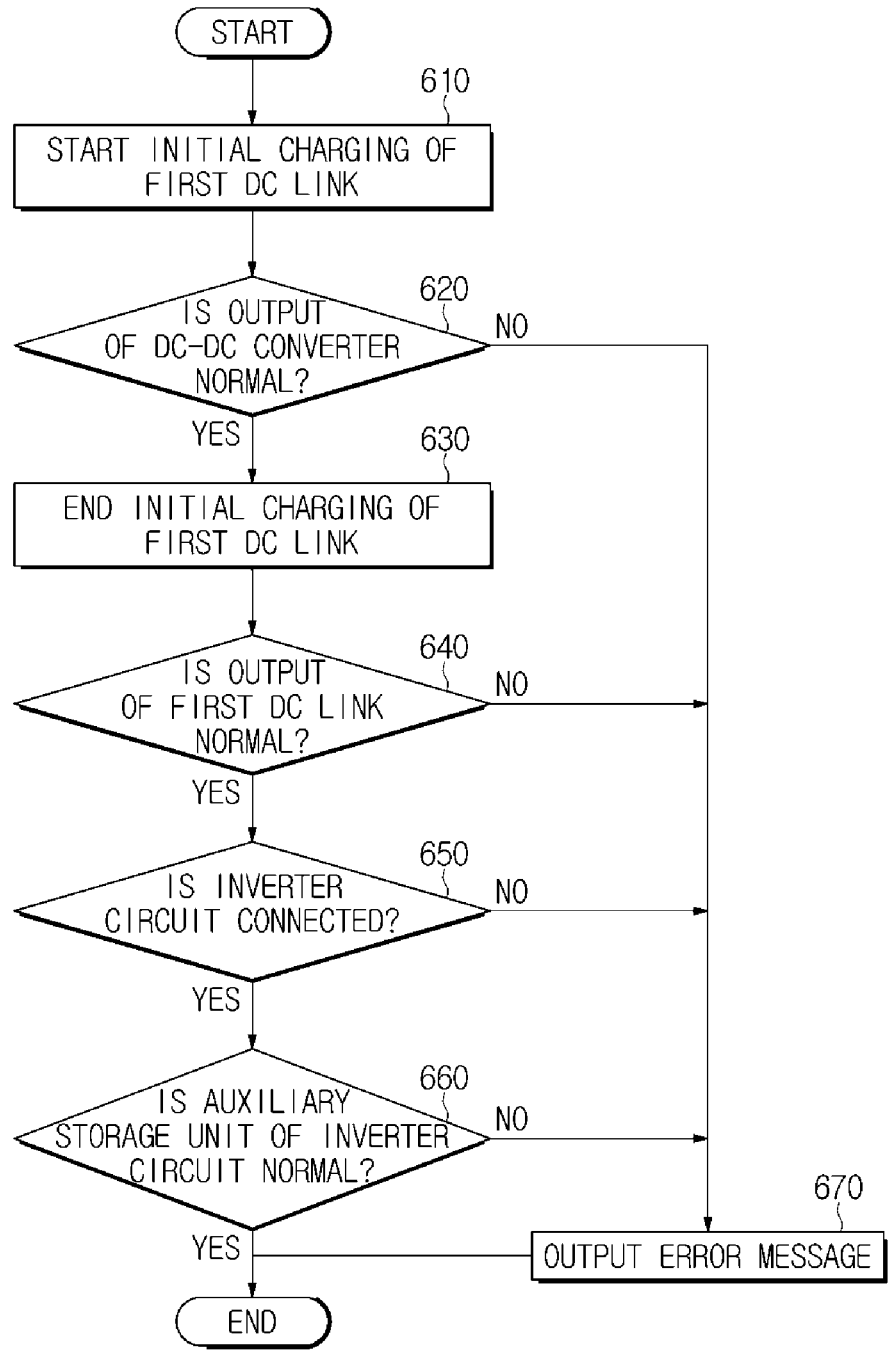
[Fig. 15]

[Fig. 16]
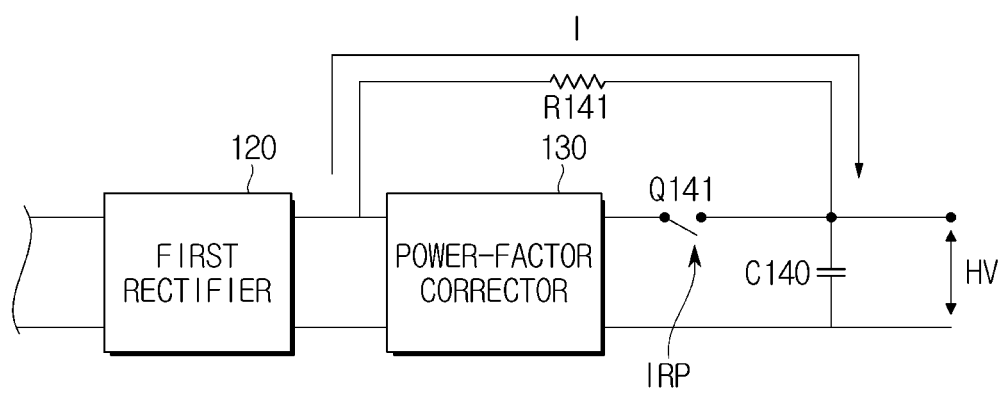

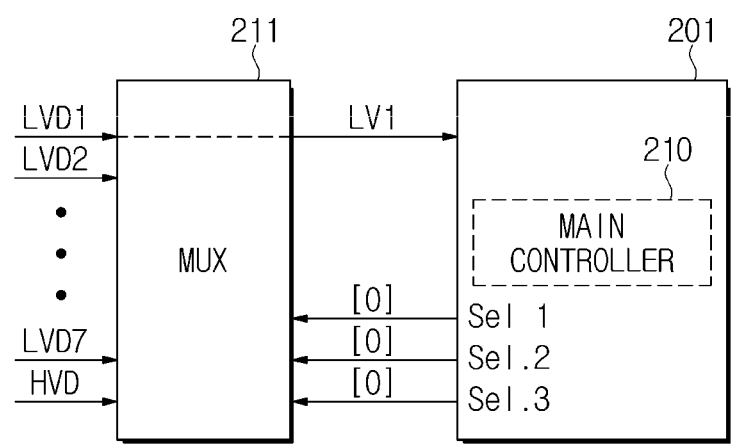
[Fig. 17a]

【Fig. 17b】
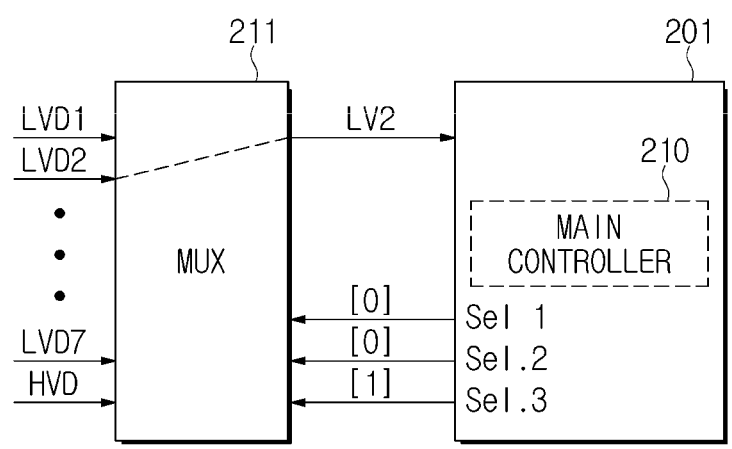

[Fig. 18]
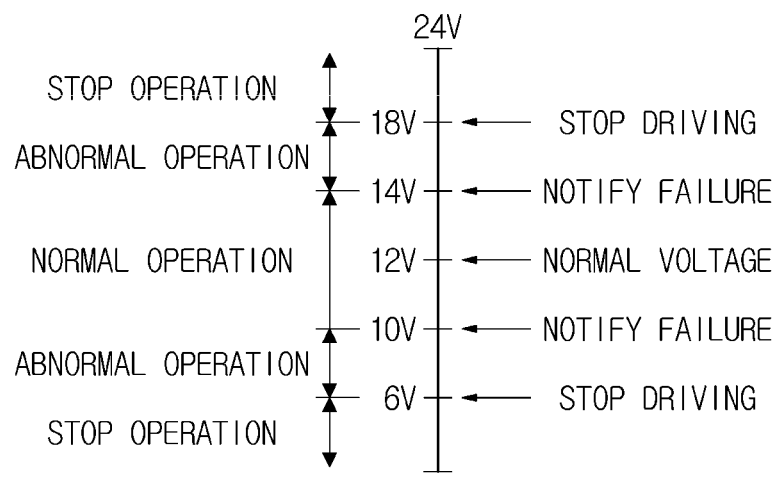

[Fig. 19a]
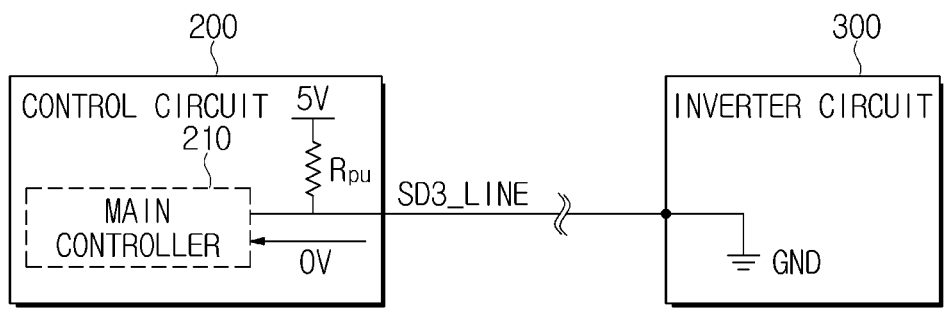

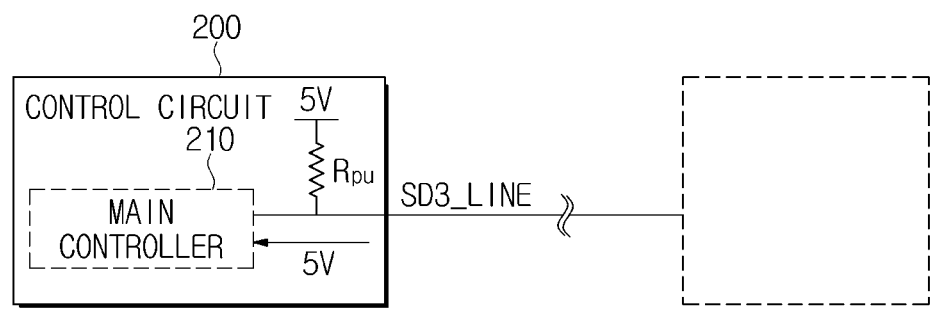
[Fig. 19b]

【Fig. 20a】
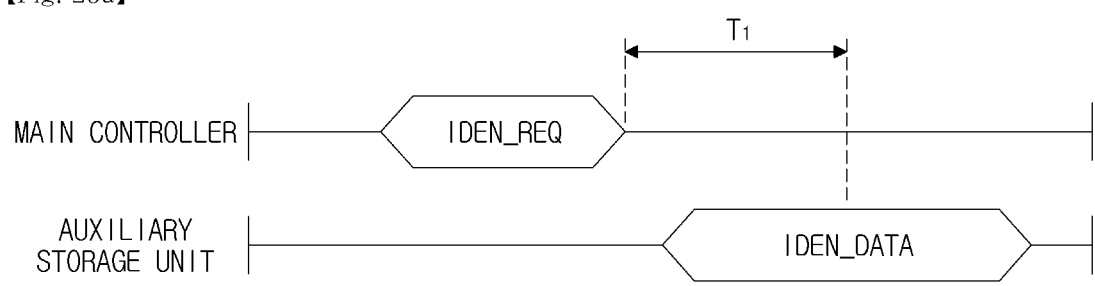

[Fig. 20b]
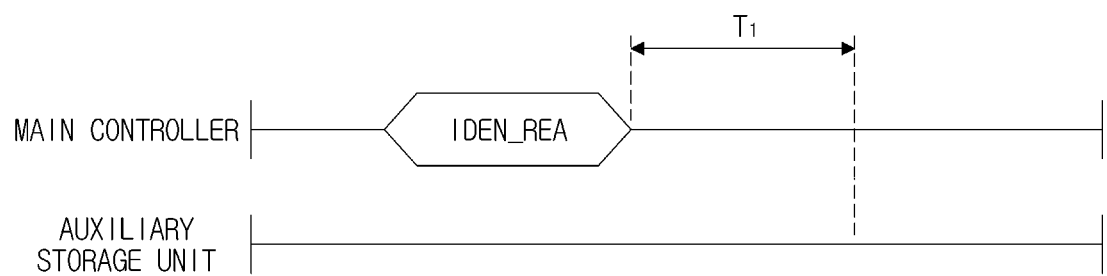

[Fig. 21]
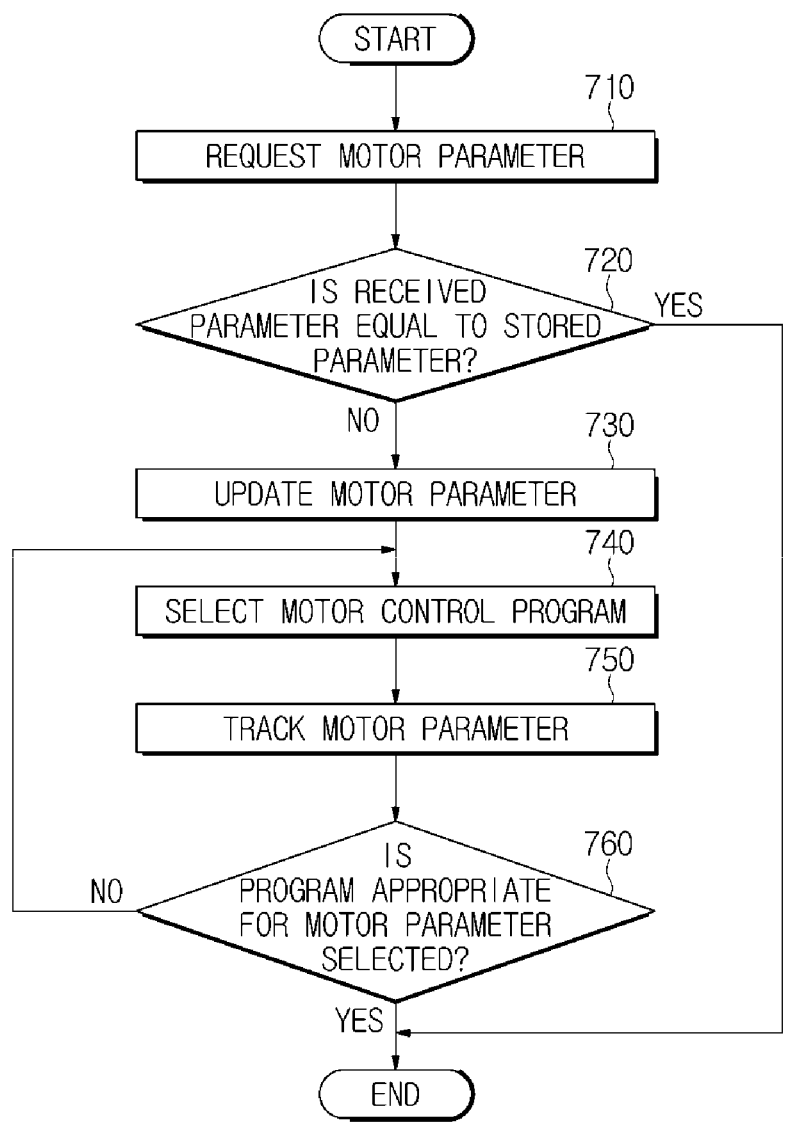

[Fig. 22]
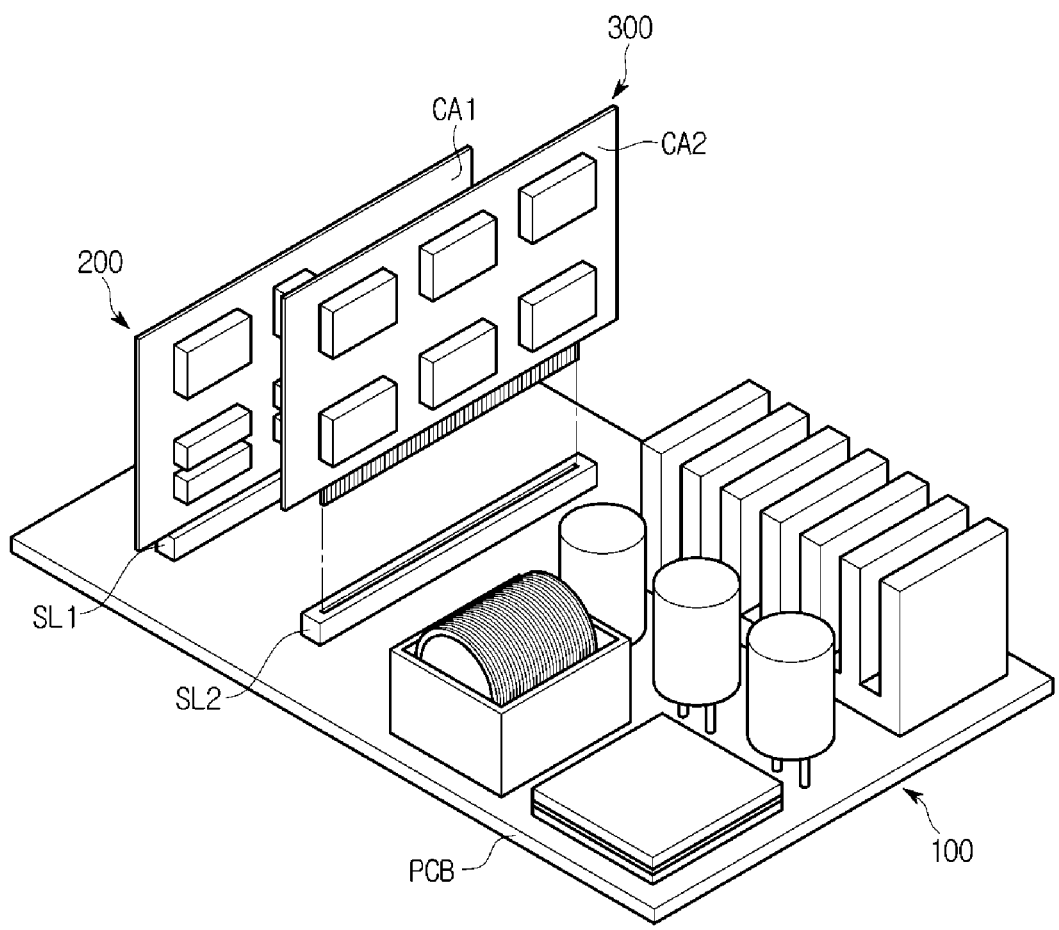

[Fig. 23]
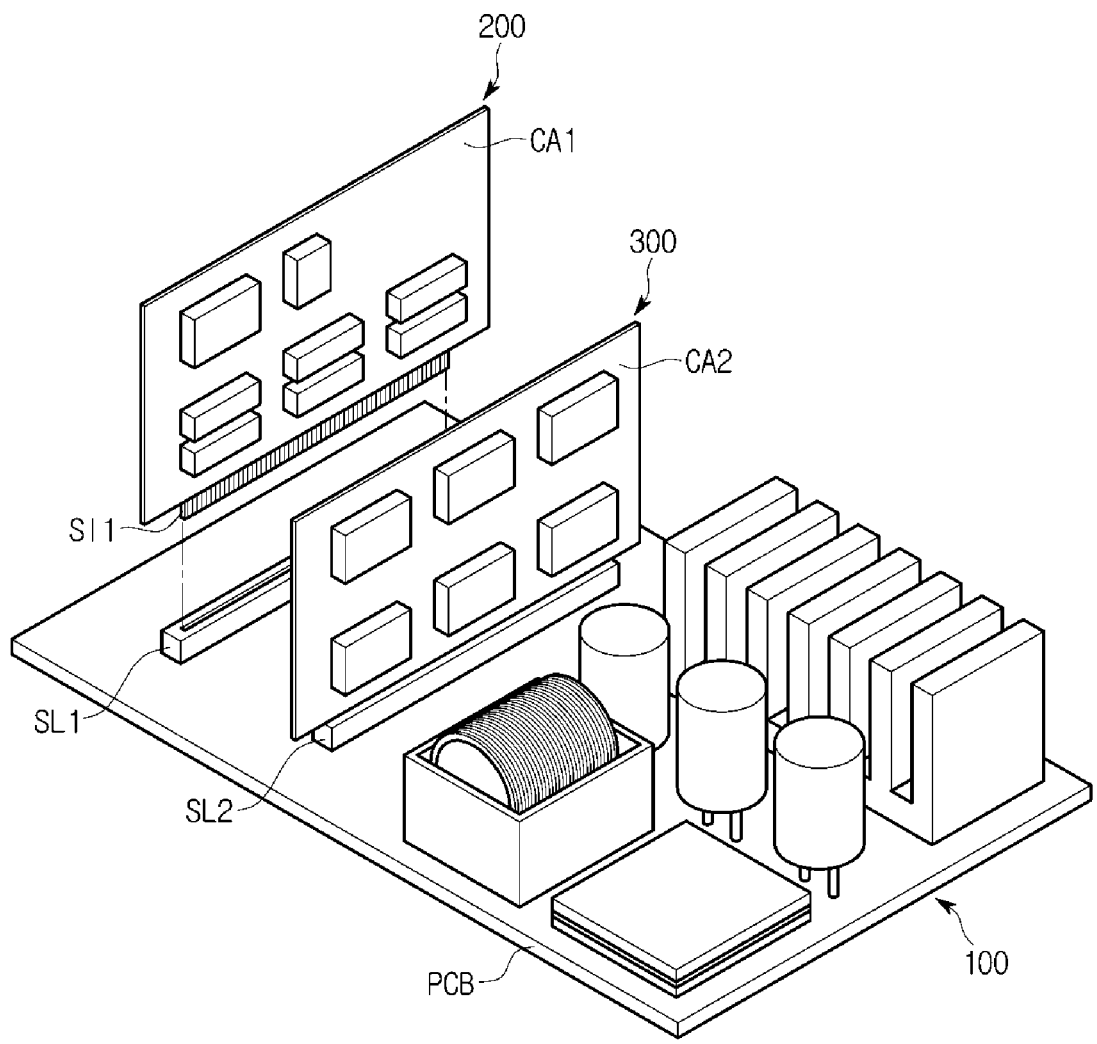

[Fig. 24]
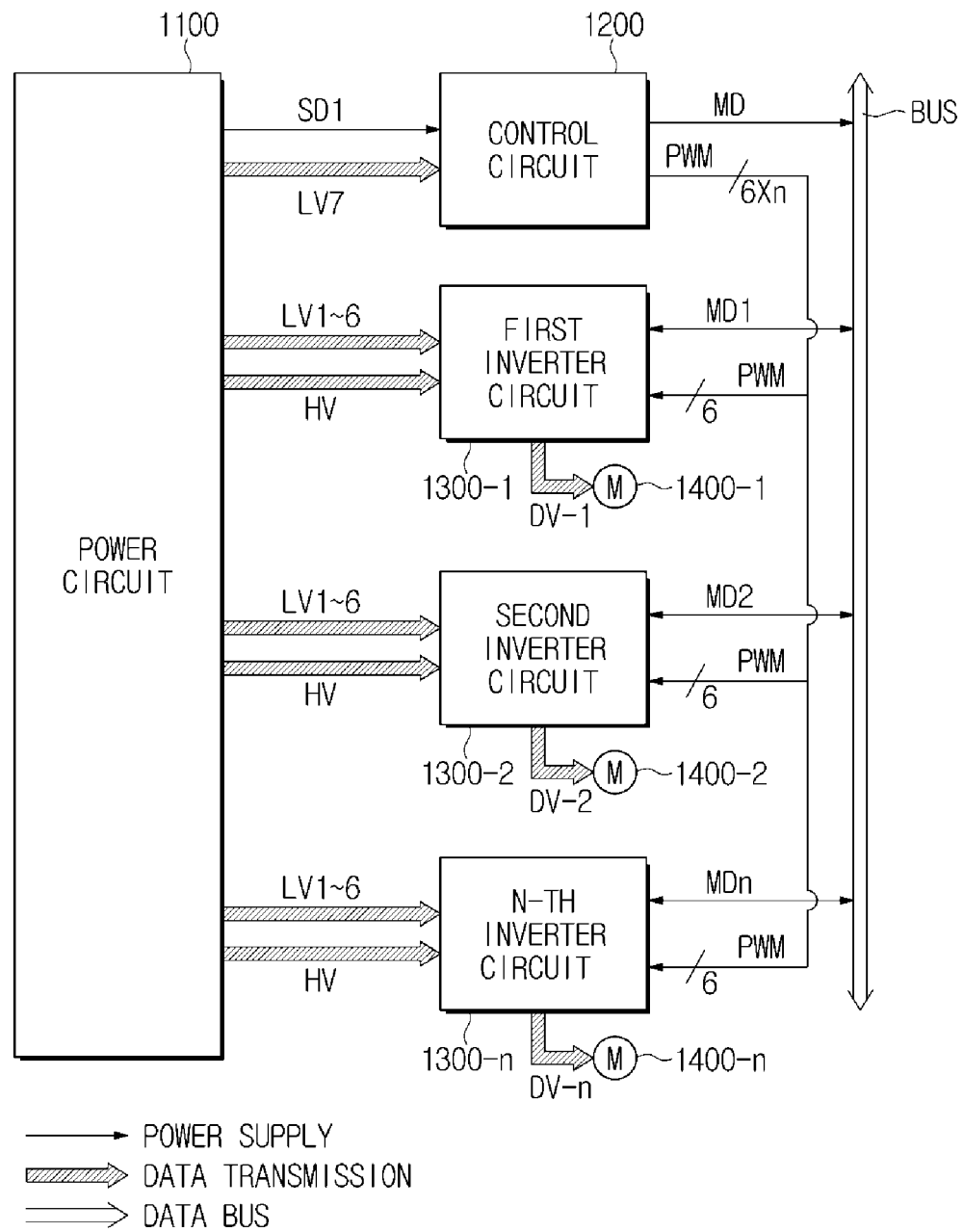

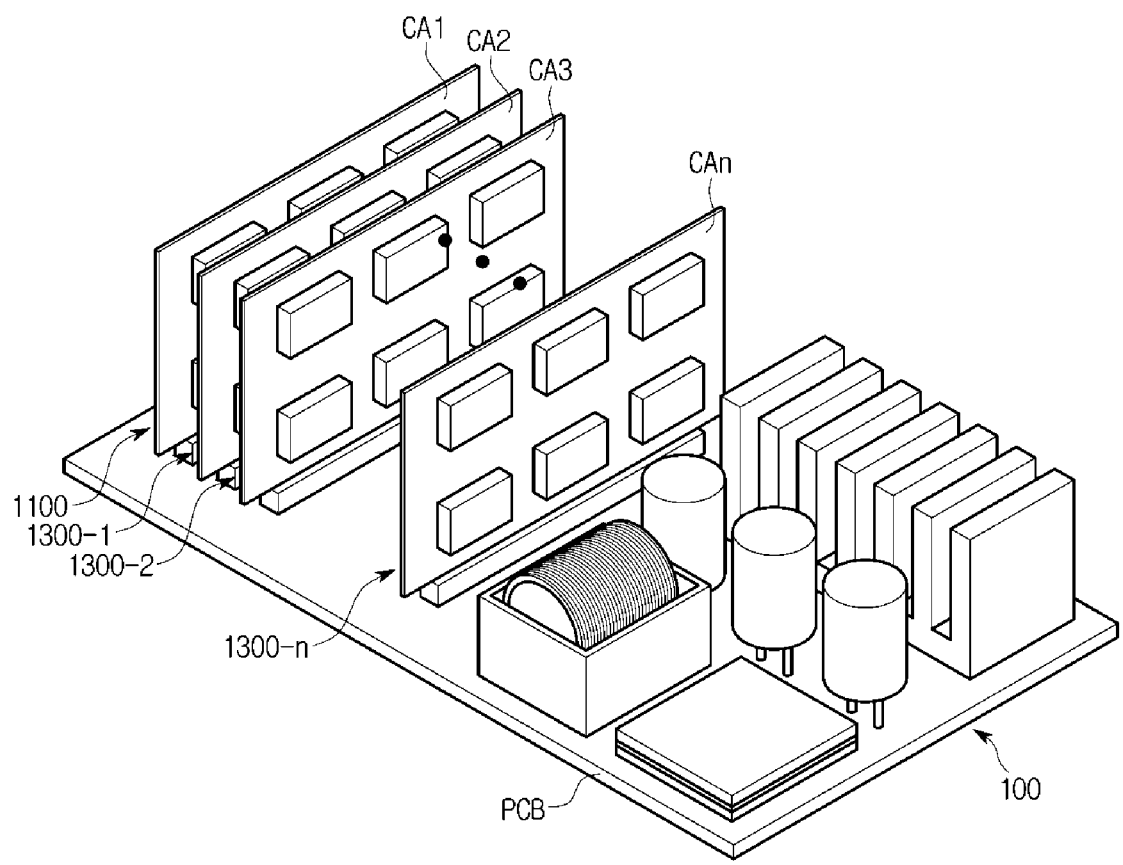
[Fig. 25]

【Fig. 26】
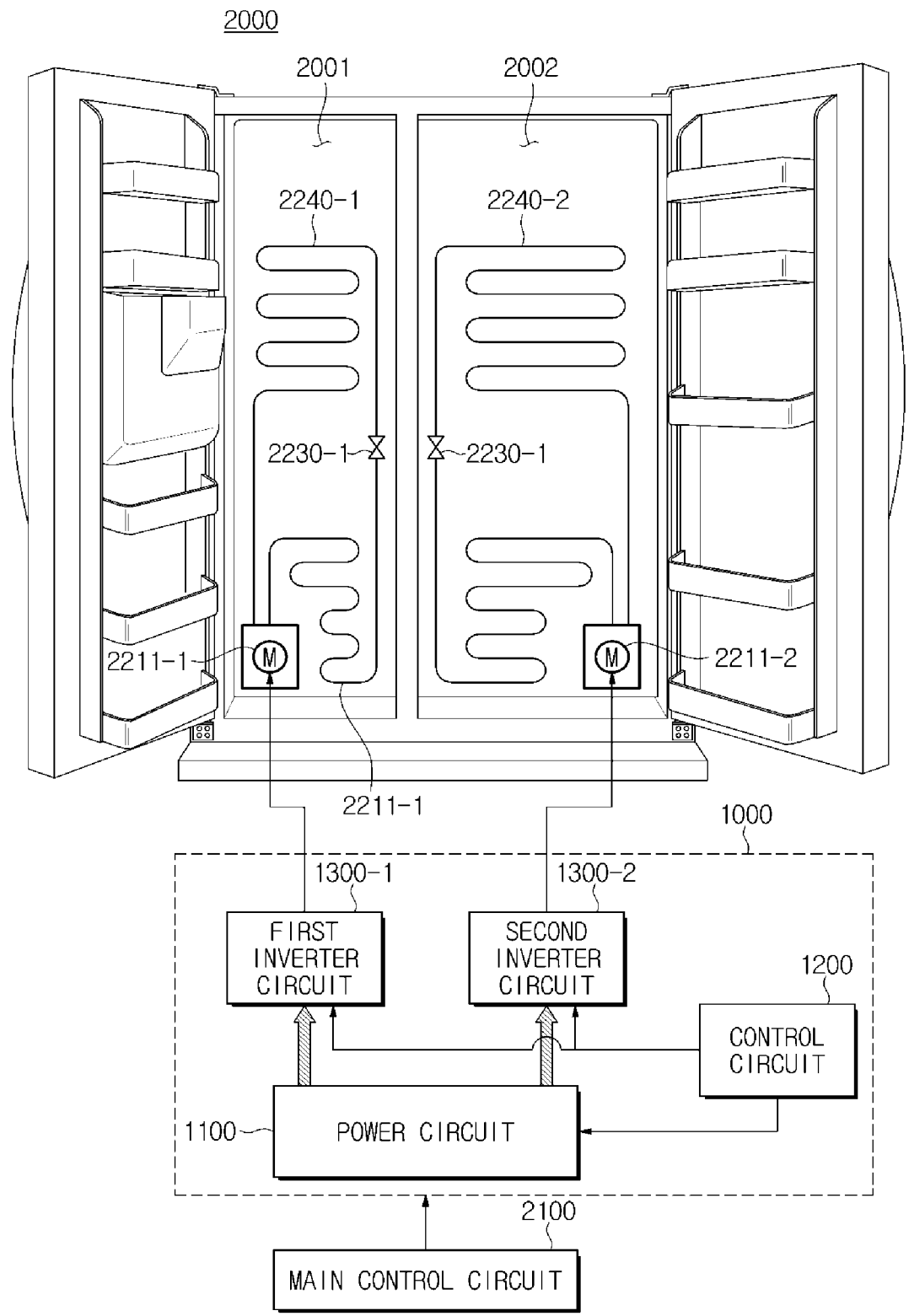

[Fig. 27]
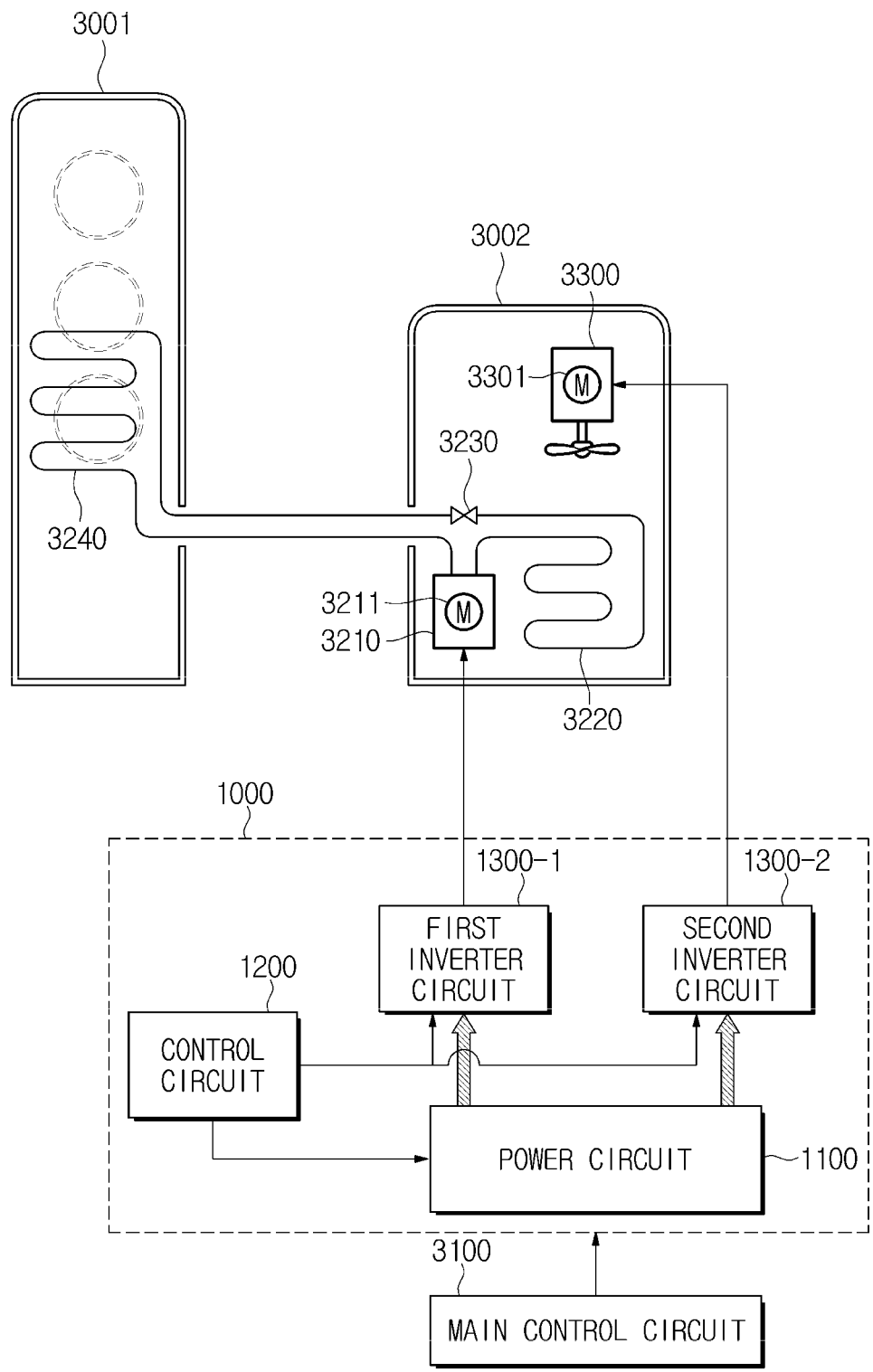

MOTOR DRIVING APPARATUS, METHOD FOR CONTROLLING MOTOR DRIVING APPARATUS, INVERTER APPARATUS, AND POWER APPARATUS

CROSS-REFERENCE TO RELATED APPLICATIONS

This application is a National Phase Application under 35 U.S.C. § 371 of PCT International Patent Application No. PCT/KR2016/009328, filed Aug. 23, 2016 which claims the foreign priority benefit under 35 U.S.C. § 119 to Korean Patent Application No. 10-2015-0139523 filed Oct. 5, 2015, the contents of which are incorporated herein by reference.

TECHNICAL FIELD

The present invention relates to a motor driving apparatus, a method of controlling a motor driving apparatus, an inverter apparatus, and a power apparatus, and more particularly, to a motor driving apparatus including a slot-type inverter, a method of controlling a motor driving apparatus, an inverter apparatus, and a power apparatus.

BACKGROUND ART

A motor is widely used not only for household appliances, such as a washing machine, a refrigerator, an air conditioner, and a cleaner, but also for electric vehicles and hybrid vehicles that have lately attracted attention.

In addition, inverters are widely used to constantly maintain a rotation speed of a motor regardless of a load variation. An inverter converts direct-current (DC) power into alternating-current (AC) power using a plurality of switches. In this case, the inverter may vary a frequency of a voltage and a magnitude of a current applied to a motor according to a load and rotation speed of the motor.

A motor driving apparatus including the inverter may additionally include a power circuit configured to supply DC power to the inverter and a control circuit configured to control a plurality of switches included in the inverter.

Conventionally, it has been difficult to maintain and repair a motor driving apparatus because an inverter, a power circuit, and a control circuit are mounted on a single printed circuit board (PCB). Specifically, when a failure occurs in any one of the inverter, the power circuit, and the control circuit included in the motor driving apparatus, it is inconvenient to replace the entire PCB on which the inverter, the power circuit, and the control circuit are mounted.

DISCLOSURE

Technical Problem

One aspect of the present invention is directed to providing a motor driving apparatus capable of individually maintaining and repairing an inverter, a power circuit, and a control circuit included in the motor driving apparatus.

Another aspect of the present invention is directed to providing a motor driving apparatus in which an inverter, a power circuit, and a control circuit are respectively mounted on a plurality of printed circuit boards (PCBs), which are electrically connected to one another.

Another aspect of the present invention is directed to providing a motor driving apparatus in which an inverter, a power circuit, and a control circuit are respectively mounted on a plurality of PCBs, wherein when a PCB on which the inverter is mounted is replaced, the replaced inverter may be automatically recognized.

Technical Solution

Another aspect of the present invention is directed to providing a motor driving apparatus in which an inverter, a power circuit, and a control circuit are respectively mounted on a plurality of PCBs, wherein when a PCB on which the inverter is mounted is replaced, the replaced inverter may be automatically recognized.

In accordance with one aspect of the present disclosure, a motor driving apparatus includes a first module on which an inverter circuit configured to supply a driving current to a motor is mounted, a second module on which a control circuit configured to control the inverter circuit is mounted, and a third module on which a power circuit configured to supply direct-current (DC) power to at least one of the inverter circuit and the control circuit is mounted, and the first module and the second module may be detachably attached to the third module.

The inverter circuit may include an inverter configured to convert DC power supplied from the power circuit into alternating-current (AC) power and supply the converted AC power to the motor, an auxiliary storage unit configured to store parameters of the motor, and a first communication interface configured to communicate with the control circuit.

The control circuit may include a main storage unit configured to store parameters of the motor, a second communication interface configured to communicate with the inverter circuit, and a main controller configured to manage the parameters stored in the main storage unit.

The main controller may update the parameters stored in the main storage unit based on the parameters stored in the auxiliary storage unit.

The main controller may receive a parameter from the auxiliary storage unit through the second communication interface and update a parameter stored in the main storage unit based on the received parameter when the received parameter is different from the parameter stored in the main storage unit.

A data bus configured to couple the first communication interface to the second communication interface may be formed in the third module.

A connection detection line configured to couple the inverter circuit to the control circuit may be formed in the third module. One end of the connection detection line may be coupled to a ground of the inverter circuit, and another end of the connection detection line may be coupled to the main controller.

The main controller may determine whether the second module is inserted into the third module, based on a signal of the connection detection line.

The control circuit may further include an inverter controller configured to control the inverter included in the inverter circuit.

The power circuit may include a high-voltage power circuit configured to supply high-voltage DC power to the inverter circuit, a high-voltage sensor configured to measure a voltage value of the high-voltage DC power and output a high-voltage detection signal corresponding to the voltage value of the high-voltage DC power, a low-voltage power circuit configured to supply low-voltage DC power to the inverter circuit and the control circuit, and a low-voltage sensor configured to measure a voltage value of the low-voltage DC power and output a low-voltage detection signal corresponding to the voltage value of the high-voltage DC power.

The control circuit may include a multiplexer configured to multiplex the high-voltage detection signal and the low-voltage detection signal, and a main controller configured to receive at least one of the high-voltage detection signal and the low-voltage detection signal from the multiplexer.

The main controller may output a selection signal for selecting at least one of the high-voltage detection signal and the low-voltage detection signal to the multiplexer, and the multiplexer may output at least one of the high-voltage detection signal and the low-voltage detection signal to the main controller based on the selection signal.

The main controller may warn of a failure in the power circuit when a voltage value of the at least one of the high-voltage detection signal and the low-voltage detection signal deviates from a predetermined voltage range.

The main controller may stop operation of the power circuit when a voltage value of the at least one of the high-voltage detection signal and the low-voltage detection signal deviates from a predetermined voltage range.

In accordance with one aspect of the present disclosure, a method of controlling a motor driving apparatus, which comprises a first module on which an inverter circuit configured to drive a motor is mounted, a second module on which a control circuit configured to control the inverter circuit is mounted and a communication interface configured to connect the first module with the second module, includes transmitting a first motor parameter stored in an auxiliary storage unit included in the inverter circuit to the control circuit, comparing the first motor parameter with a second motor parameter stored in a main storage unit included in the control circuit, and storing the first motor parameter in the main storage unit when the first motor parameter is different from the second motor parameter.

The method may further include selecting a control program for controlling the motor based on the first motor parameter when the first motor parameter is different from the second motor parameter.

The method may further include applying the first motor parameter to the selected control program and tracking the motor parameter.

The method may include executing the selected control program according to a result of the tracking of the motor parameter and thereby controlling the motor.

In accordance with one aspect of the present disclosure, a method of controlling a motor driving apparatus, which comprises a first module on which an inverter circuit is mounted, a second module on which a control circuit is mounted and a third module on which a power circuit configured to supply power to at least one of the inverter circuit and the control circuit is mounted, includes determining whether voltage values of a plurality of direct-current (DC) powers output from the power circuit is within a predetermined reference range, determining whether the inverter circuit is coupled to the control circuit and the power circuit when each of the voltage values of the plurality of the DC powers is within a normal range, transmitting data stored in a memory included in the inverter circuit to the control circuit when the inverter circuit is coupled to the control circuit and the power circuit.

The determining whether the voltage values of the plurality of the DC powers is within a predetermined reference range may include generating a plurality of detection signals corresponding to the voltage values of the plurality of the DC powers, multiplexing the plurality of the detection signals, and determining whether the multiplexed detection signals is within the normal range.

The determining whether the inverter circuit is coupled to the control circuit and the power circuit may include determining whether the first module is attached to the third module.

The determining whether the inverter circuit is coupled to the control circuit and the power circuit may include determining whether the inverter circuit is coupled to the control circuit and the power circuit based on a signal of a connection detection line, one end of which is coupled to a ground of the inverter circuit and another end of which is coupled to the control circuit.

In accordance with one aspect of the present disclosure, an inverter apparatus includes a slot interface configured to be coupled to a main board on which a power circuit is mounted, an inverter configured to receive direct-current (DC) power from the power circuit, convert the DC power and supply the converted DC power to a motor, and an auxiliary storage unit configured to store a parameter of the motor, and the slot interface may be inserted into a slot of the main board to be attached to the main board.

The auxiliary storage unit may include a non-volatile memory configured to store the parameter of the motor, a communication interface configured to be coupled to a data bus formed on the main board, and a memory controller configured to control the communication interface to transmit the parameter of the motor stored in the non-volatile memory through the data bus.

In accordance with one aspect of the present disclosure, a power apparatus includes a first slot configured to be inserted into a first printed circuit board (PCB) on which an inverter circuit configured to supply a driving current to motor is mounted, a second slot configured to be inserted into a second PCB on which a control circuit configured to control the inverter circuit is mounted, and a power circuit configured to supply first direct-current (DC) power to the inverter circuit through the first slot and supply second DC power to the control circuit through the second slot.

The power circuit may include a first power circuit configured to supply the first DC power to the inverter circuit and a second power circuit configured to supply the second DC power to the control circuit.

The power circuit may further include a data bus through which the control circuit transmits data to the inverter circuit and receives data from the inverter circuit.

In accordance with one aspect of the present disclosure, a motor driving apparatus includes a plurality of card modules on which a plurality of inverter circuits configured to supply a driving current to a plurality of motors is mounted, respectively, and a main module on which a power circuit configured to supply direct-current (DC) power to the plurality of the inverter circuits is mounted, and the plurality of the card modules may be detachably attached to the main module.

Advantageous Effects

An aspect of the present invention can provide a motor driving apparatus in which it is possible to individually maintain and repair an inverter, a power circuit, and a control circuit included in a motor driving apparatus.

Another aspect of the present invention can provide a motor driving apparatus in which an inverter, a power circuit, and a control circuit are respectively mounted on a plurality of printed circuit boards (PCBs) that are electrically connected to one another.

Another aspect of the present invention can provide a motor driving apparatus in which an inverter, a power circuit, and a control circuit are respectively mounted on a plurality of PCBs so that when a PCB on which the inverter is mounted is replaced, the replaced inverter can be automatically recognized.

Another aspect of the present invention can provide a motor driving apparatus in which an inverter, a power circuit, and a control circuit are respectively mounted on a plurality of PCBs so that when the control circuit, while being mounted on the PCB, is replaced with a new control circuit, the new control circuit can automatically obtain motor information.

DESCRIPTION OF DRAWINGS

FIG. 1 illustrates a motor driving apparatus according to an exemplary embodiment.

FIG. 2 illustrates an example of the motor driving apparatus, according to an exemplary embodiment.

FIG. 3 illustrates another example of the motor driving apparatus, according to an exemplary embodiment.

FIG. 4 illustrates a power circuit included in a motor driving apparatus according to an embodiment.

Further, FIG. 5 illustrates an example of a high-voltage power circuit included in the power circuit shown in FIG. 4.

FIG. 6 illustrates an example of a low-voltage power circuit included in the power circuit shown in FIG. 4.

FIGS. 7a and 7b (7A and 7B) illustrates an example of a low-voltage sensor included in the low-voltage power circuit shown in FIG. 6.

FIG. 8 illustrates an inverter circuit included in a motor driving apparatus according to an embodiment.

FIG. 9 illustrates configuration of a parameter storage unit included in the inverter circuit shown in FIG. 8.

FIG. 10 illustrates a control circuit included in a motor driving apparatus according to an exemplary embodiment.

FIG. 11 illustrates a configuration of an inverter controller included in the control circuit shown in FIG. 10.

FIGS. 12, 13, and 14 are diagrams for describing operation of a main controller included in the control circuit shown in FIG. 10.

FIG. 15 illustrates an initial operation of a motor driving apparatus according to an embodiment.

FIG. 16 illustrates a case in which the motor driving apparatus initially charges a first DC link due to the operation shown in FIG. 15.

FIGS. 17A, 17B, and 18 illustrate a case in which the motor driving apparatus checks the output of a DC-DC converter according to the operation shown in FIG. 15.

FIGS. 19A and 19B illustrate a case in which the motor driving apparatus detects the connection of an inverter circuit according to the operation shown in FIG. 15.

FIGS. 20A and 20B illustrate a case in which the motor driving apparatus confirms motor parameters stored in the inverter circuit according to the operation shown in FIG. 15.

FIG. 21 illustrates an update operation of a motor driving apparatus according to an exemplary embodiment.

FIG. 22 illustrates the replacement of an inverter circuit of the motor driving apparatus, according to an exemplary embodiment.

FIG. 23 illustrates the replacement of a control circuit of the motor driving apparatus, according to an exemplary embodiment.

FIG. 24 illustrates a motor driving apparatus according to another exemplary embodiment.

FIG. 25 illustrates an example of a motor driving apparatus according to another exemplary embodiment.

FIG. 26 illustrates configuration of a refrigerator including a motor driving apparatus according to an exemplary embodiment.

FIG. 27 illustrates configuration of an air conditioner including a motor driving apparatus according to an exemplary embodiment.

MODES OF THE INVENTION

Hereinafter, embodiments described in the present specification and configurations shown in the drawings are only examples of the present invention, and various modified examples may be given at the time of filing of the present application to replace the embodiments and drawings of the present specification.

The terminology used herein to describe embodiments of the invention is not intended to restrict and/or limit the scope of the invention.

For example, the singular forms "a," "an," and "the" may be intended to include the plural forms as well, unless the context clearly indicates otherwise.

It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section.

Further, as used herein, terms, such as "~unit," "~block," "~member," "module," and the like, may denote a unit for processing at least one function or operation, for example, software stored in a memory or hardware, such as a field-programmable gate array (FPGA) or an application specific integrated circuit (ASIC). However, the terms, such as "~unit," "~block," "~member," "~module," and the like, are not limited to software or hardware but may be configurations, which are stored on accessible storage media and performed by at least one processor.

Hereinafter, an exemplary embodiment of the present invention will be described in detail with reference to the accompanying drawings. In the drawings, like reference numbers or numerals may refer to components or elements that perform substantially the same functions.

FIG. 1 illustrates a motor driving apparatus according to an exemplary embodiment. Further, FIG. 2 illustrates an example of the motor driving apparatus, according to an exemplary embodiment. FIG. 3 illustrates another example of the motor driving apparatus, according to an exemplary embodiment.

Referring to FIGS. 1 to 3, a motor driving apparatus 1 includes an inverter circuit 300 configured to supply driving power DV to a motor 400, a control circuit 200 configured to control the inverter circuit 300, and a power circuit 100 configured to supply power to the inverter circuit 300 and the control circuit 200.

The power circuit 100 receives power from an external power source ES, supplies a high-voltage power HV and first to sixth low-voltage powers LV1, LV2, . . . and LV6 to the inverter circuit 300, and supplies a seventh low-voltage power LV7 to the control circuit 200. Further, the power circuit 100 may provide first sensing data SD1 related to an output voltage of the power circuit 100 to the control circuit 200.

Here, the external power source ES may be a single-phase alternating-current (AC) power source of 110 V or 220 V, which is widely used for domestic use, or a 3-phase AC power source of 380 V, 400 V, or 460 V, which is widely used for industrial use. Further, the external power source ES may be a direct-current (DC) power source supplied by a solar generator.

Hereinafter, it will be assumed for brevity that the external power source ES is the single-phase AC power source. The single-phase AC power source may be supplied through a pair of wires. In this case, an AC voltage having an effective value of 110 V or 220 V is applied between the pair of wires.

The inverter circuit 300 receives a high-voltage power HV and first to sixth low-voltage powers LV1 to LV6 from the power circuit 100. Further, the inverter circuit 300 converts the high-voltage power HV into driving power DV based on a pulse-width modulation signal PWM supplied from the control circuit 200 and outputs the converted driving power DV to the motor 400.

Here, the motor 400 may be a permanent magnet synchronous motor including a permanent magnet or an induction motor using electromagnetic induction.

The permanent magnet synchronous motor may include a rotor including a permanent magnet and a stator including a coil. When an AC current is supplied to the coil, a rotational magnetic field is generated. The rotor may rotate due to magnetic interaction between a magnetic field of the permanent magnet and the rotational magnetic field of the coil.

The induction motor includes a rotor, which is a conductor, and a stator including a coil. When an AC current is supplied to the coil, an induced current is generated in the rotor, which is the conductor, together with a rotational magnetic field. Further, the rotor may rotate due to magnetic interaction between a magnetic field caused by the induced current and a magnetic field caused by the coil.

In addition, the motor 400 may include a hall sensor configured to detect rotational displacement of the rotor. The hall sensor is disposed at an appropriate position of the stator included in the motor 400, senses a variation in magnetic field due to the rotation of the rotor, and detects a position of the rotor based on the sensed magnetic field.

The control circuit 200 may receive a seventh low-voltage power LV7 from the power circuit 100 and receive second sensing data SD2 related to the rotation of the motor 400 and third sensing data SD3 related to the connection of the inverter circuit 300 from the inverter circuit 300. The control circuit 200 may generate various control signals PFC, IRP, and CON for controlling the power circuit 100 based on the first sensing data SD1, and provide the various control signals PFC, IRP, and CON to the power circuit 100. In addition, the control circuit 200 may generate a pulse-width modulation signal PWM based on the second sensing data SD2 and transmit the pulse-width modulation signal PWM to the inverter circuit 300.

Furthermore, the control circuit 200 and the inverter circuit 300 may exchange data through the data bus BUS. Specifically, the control circuit 200 may transmit first memory data MD1 to the inverter circuit 300 through the data bus BUS, and the inverter circuit 300 may transmit second memory data MD2 through the data bus BUS.

The above-described power circuit 100, control circuit 200, and inverter circuit 300 may be respectively mounted on separate printed circuit boards (PCBs). The power circuit 100, the control circuit 200, and the inverter circuit 300 may be connected to one another through connectors.

For example, as shown in FIG. 2, the power circuit 100, the control circuit 200, and the inverter circuit 300 may be mounted on a main board MB, a first card CA1, and a second card CA2, respectively. Here, each of the main board MB, the first card CA1, and the second card CA2 may be implemented as a PCB.

The main board MB may include a first slot SL1 and a second slot SL2, which are electrically connected to the first card CA1 and the second card CA2, respectively. Further, the first card CA1 may include a first slot interface SI1, which is inserted into the first slot SL1 of the main board MB, and the second card CA2 may include a second slot interface SI2, which is inserted into the second slot SL2 thereof.

When the first slot interface SI1 of the first card CA1 is inserted into the first slot SL1 of the main board MB, the first card CA1 may be not only fixed to the main board MB but also connected to the main board MB. In other words, the control circuit 200 mounted on the first card CA1 is electrically connected to the power circuit 100 mounted on the main board MB. Further, the control circuit 200 and the power circuit 100 may supply power and transmit/receive data through the first slot interface SI1 and the first slot SL1.

In addition, when the first slot interface SI2 of the second card CA2 is inserted into the second slot SL2 of the main board MB, the second card CA2 is not only fixed to the main board MB but also electrically connected to the main board MB. In other words, the inverter circuit 300 mounted on the second card CA2 is electrically connected to the power circuit 100 mounted on the main board MB. Further, the inverter circuit 300 and the power circuit 100 may supply power and transmit and receive data through the second slot interface SI2 and the second slot SL2.

When the first slot interface SI1 of the first card CA1 and the second slot interface SI2 of the second card CA2 are respectively inserted into the first slot SL1 and the second slot SL2 of the main board MB, the first card CA1 and the second card CA2 are electrically connected to the main board MB, and the first card CA1 is electrically connected to the second card CA2. In other words, by inserting the cards CA1 and CA2 into the slots SL1 and SL2 of the main board MB, the cards CA1 and CA2 may be connected not only to the main board MB but also to other cards CA1 and CA2 inserted into the slots SL1 and SL2 of the main board MB.

As described above, the power circuit 100, the control circuit 200, and the inverter circuit 300 may be respectively mounted on separate PCBs MB, CA1, and CA2, and the PCBs MB, CA1, and CA2 may be combined with one another or separate from one another. Specifically, the first card CA1 on which the control circuit 200 is mounted and the second card CA2 on which the inverter circuit 300 is mounted may be attached to or detached from the main board MB on which the power circuit 100 is mounted.

Although FIG. 2 illustrates a method of attaching the first card CA1 and the second card CA2 to the main board MB in a direction perpendicular to the main board MB, the present invention is not limited thereto.

For example, as shown in FIG. 3, the first card CA1 and the second card CA2 may be attached to the main board MB in a horizontal direction with respect to the main board MB.

Specifically, a pair of first male connectors MC1 may be provided on a bottom surface of the first card CA1, and a pair of first female connectors FC1 may be provided on a top surface of the main board MB. Further, the pair of first male connectors MC1 of the first card CA1 may be provided in positions corresponding to the pair of first female connectors FC1 of the main board MB so that the pair of first male connectors MC1 of the first card CA1 may be inserted into the pair of first female connectors FC1 of the main board MB. When the pair of first male connectors MC1 are inserted into the pair of first female connectors FC1, the first card CA1 is fixed to the main board MB, and the control circuit 200 mounted on the first card CA1 is electrically connected to the power circuit 100 mounted on the main board MB.

Further, a pair of second male connectors MC2 may be provided on a bottom surface of the second card CA2, and a pair of second female connectors FC2 may be provided on a top surface of the main board MB. The pair of second male connectors MC2 of the second card CA2 may be provided in positions corresponding to the pair of second female connectors FC2 of the main board MB so that the pair of second male connectors MC2 may be inserted into the pair of second female connectors FC2. When the pair of second male connectors MC2 are inserted into the pair of second female connectors FC2, the second card CA2 may be fixed to the main board MB, and the control circuit 200 mounted on the second card CA2 may be electrically connected to the power circuit 100 mounted on the main board MB.

In addition, when the first card CA1 and the second card CA2 are electrically connected to the main board MB, the first card CA1 may also be electrically connected to the second card CA2. In other words, the control circuit 200 may be electrically connected to the inverter circuit 300.

As shown in FIGS. 2 and 3, the first card CA1 and the second card CA2 may be directly inserted into the main board MB, and the first card CA1 and the main board MB may be connected and the second card CA2 and the main board MB may be connected by using connecting lines. In this case, the connecting lines may utilize a flexible material and allow the first card CA1 and the second card CA2 to be arranged more freely.

As described above, when the power circuit 100 is mounted on the main board MB and the control circuit 200 and the inverter circuit 300 are mounted on the first card CA1 and the second card CA2, respectively, repair and maintenance of the motor driving apparatus 1 may be facilitated.

For example, when the power circuit 100, the control circuit 200, and the inverter circuit 300 are integrally provided and a malfunction occurs in the inverter circuit 300, the power circuit 100, the control circuit 200, and the inverter circuit 300 should be all replaced.

However, when the power circuit 100, the control circuit 200, and the inverter circuit 300 are implemented as separate PCBs and a malfunction occurs in the inverter circuit 300, only the second card CA2 on which the inverter circuit 300 is mounted may be replaced. That is, a user may separately replace broken circuits among the power circuit 100, the control circuit 200, and the inverter circuit 300, so that repair and maintenance costs of the motor driving apparatus 1 may be reduced.

A case in which the power circuit 100 is mounted on the main board MB and the control circuit 200 and the inverter circuit 300 are mounted on the first and second cards CA1 and CA2, respectively, has been described above, but the case is only an example. The control circuit 200 may be mounted on the main board MB, and the power circuit 100 and the inverter circuit 300 may be mounted on the first and second cards CA1 and CA2, respectively. Further, the inverter circuit 300 may be mounted on the main board MB, and the power circuit 100 and the control circuit 200 may be mounted on the first and second cards CA1 and CA2, respectively.

Hereinafter, configuration and operation of each of the power circuit 100, the control circuit 200, and the inverter circuit 300 will be described.

To begin, the power circuit 100 will be described.

FIG. 4 illustrates a power circuit included in a motor driving apparatus according to an embodiment. Further, FIG. 5 illustrates an example of a high-voltage power circuit included in the power circuit shown in FIG. 4, and FIG. 6 illustrates an example of a low-voltage power circuit included in the power circuit shown in FIG. 4. In addition, FIG. 7 illustrates an example of a low-voltage sensor included in the low-voltage power circuit shown in FIG. 6.

As shown in FIG. 4, a power circuit 100 includes a high-voltage power circuit 101 and a low-voltage power circuit 102.

The high-voltage power circuit 101 may convert high-voltage AC power supplied from an external power source ES into high-voltage DC power and output the high-voltage DC power.

The high-voltage power circuit 101 may include an electromagnetic interference (EMI) filter 110 configured to remove noise from AC power supplied from the external power source ES, a first rectifier 120 configured to convert AC power supplied from the external power source ES into DC power, a power-factor corrector 130 configured to improve a power factor of the AC power supplied from the external power source ES, a first DC link 140 configured to remove ripple from the DC power output from the first rectifier 120, and a high-voltage sensor 150 configured to measure a voltage value of the DC power output by the first DC link 140. The high-voltage power circuit 101 is not limited to the EMI filter 110, the first rectifier 120, the power-factor corrector 130, the first DC link 140, and the high-voltage sensor 150 shown in FIG. 4 but may further include various additional circuits, such as an overvoltage protection circuit and an inrush circuit.

The EMI filter 110 receives AC power from the external power source ES first, and removes high-frequency noise included in the AC power of the external power source ES.

To remove the high-frequency noise, the EMI filter 110 typically has the form of a low-pass filter (LPF) that blocks a high-frequency signal and passes a low-frequency signal. For example, as shown in FIG. 5, the EMI filter 110 may include two inductors L111 and L112, which are respectively connected in series to two terminals of the external power source ES, and two capacitors C111 and C112, which are respectively connected between the two inductors L111 and L112 and a ground GND. Here, the ground GND is connected to a negative terminal N during the output of the first rectifier 120 to be described below.

Here, the inductors L111 and L112 block the high-frequency signal, and the capacitors C111 and C112 bypass the high-frequency signal to the ground GND. As a result, the high-frequency noise is blocked by the EMI filter 110.

However, the EMI filter 110 shown in FIG. 5 is only an example of an adoptable filter. The EMI filter 110 may have various configurations. For example, the EMI filter 110 may have not only a series-shunt configuration shown in FIG. 5 but also a shunt-series configuration, a ⊓ configuration, or a T configuration.

The first rectifier 120 is provided at a rear end of the EMI filter 110 and receives AC power from which noise has been removed by the EMI filter 110. Further, the first rectifier 120 converts the received AC power into DC power.

The first rectifier 120 may include a diode bridge including four diodes D121, D122, D123, and D124. Specifically, a pair of diodes D121 and D122 may be connected in series to each other, a pair of diodes D123 and D124 may be connected in series to each other, and the pair of diodes D121 and D122 may be connected in parallel to the pair of diodes D123 and D124.

AC power is applied from the EMI filter 110 through nodes at which the pair of diodes D121 and D122 are connected in series to each other and the pair of diodes D123 and D124 are connected in series to each other. DC power is output through nodes at which the pair of diodes D121 and D122 are connected in parallel to the pair of diodes D123 and D124.

Furthermore, all of the four diodes D121, D122, D123, and D124 are disposed such that current flows in the same direction. For example, as shown in FIG. 5, the four diodes D121, D122, D123, and D124 may be disposed to block the flow of current from an upper side of the drawing to a lower side thereof and pass the flow of current from the lower side of the drawing to the upper side thereof.

As a result, a DC current flows out from cathode terminals of the pair of diodes D121 and D122 and the pair of diodes D123 and D124 and flows into anode terminals of the pair of diodes D121 and D122 and the pair of diodes D123 and D124. Further, the cathode terminals of the pair of diodes D121 and D122 and the pair of diodes D123 and D124 become positive terminals P of the first rectifier 120, and the anode terminals of the pair of diodes D121 and D122 and the pair of diodes D123 and D124 become negative terminals N of the first rectifier 120.

Due to the above-described first rectifier 120, AC power in which a direction in which current flows and a direction in which a voltage is applied are changed over time is converted into DC power in which a voltage is applied in one direction and current flows in the direction in which the voltage is applied.

The power-factor corrector 130 is provided at a rear end of the first rectifier 120 and receives DC power rectified by the first rectifier 120. Further, the power-factor corrector 130 reduces power loss, which occurs when AC power is converted into DC power, between the above-described first rectifier 120 and the first DC link 140 to be described below.

In order to use AC power, a phase of an AC voltage applied from the external power source ES should be equal to a phase of a current supplied to the motor driving apparatus 1. When the phase of the applied AC voltage is not equal to the phase of the supplied current, efficiency of power supplied from the external power source ES to the motor driving apparatus 1 may be reduced or, even worse, power may not be supplied. Power that cannot be used by the motor driving apparatus 1 because the phase of the applied AC voltage is not equal to the phase of the supplied current is referred to as reactive power. Power that is transmitted to the motor driving apparatus 1 because the phase of the applied AC voltage is equal to the phase of the supplied current is referred to as active power.

In addition, a power factor refers to active power for apparent power. That is, the power factor may be seen as a ratio of power actually used by the motor driving apparatus 1 to power supplied from the external power source ES. A high power factor means that the motor driving apparatus 1 uses a large portion of power supplied from the external power source ES, while a low power factor means that the motor driving apparatus 1 uses only a small portion of the supplied power.

The power-factor corrector 130 may include an inductor L130, a diode D130, and a switch Q130. In this case, the switch Q130 receives a power-factor correction signal PFC from the control circuit 200 and gets turned on and off in response to the received power-factor correction signal PFC. The control circuit 200 may generate a power-factor correction circuit PFC configured to turn on and off the switch Q130 based on a voltage of AC power supplied from the external power source ES.

Due to on/off operation of the switch Q130, current of which a phase is equal to a phase of a voltage of the AC power supplied from the external power source ES is supplied to the first DC link 140 to be described below.

Although the active power-factor correction circuit configured to improve a power factor by using the switch Q130 has been described above, the power-factor corrector 130 is not limited to an active power-factor corrector. For example, the power-factor corrector 130 may not include a switch but may include a passive power-factor correction circuit provided as a low pass filter (LPF) type.

Further, the power-factor corrector 130 is not limited to that provided at the rear end of the first rectifier 120. The power-factor corrector 130 may be provided at a front end of the first rectifier 120 or provided integrally with the first rectifier 120.

The first DC-Link 140 is provided at a rear end of the power-factor corrector 130 and receives DC power rectified by the first rectifier 120 provided at a front end of the power-factor corrector 130. Further, the first DC link 140 removes ripple included in a voltage of the DC power and outputs a smoothed DC voltage HV.

The first DC link 140 may include at least one capacitor C140 configured to remove the ripple included in the voltage of the DC power. Although FIG. 5 illustrates one capacitor C140, a plurality of capacitors may be connected in parallel to one another.

In this case, the first DC link 140 may convert DC power rectified by the first rectifier 120 into electric energy, store the electric energy, and supply the stored electric energy to the inverter circuit 300.

Recently, research has been conducted on reducing a capacitance of the capacitor C140 included in the first DC link 140. However, a capacitor having a capacitance of several millifarads (mF) is commercially widely used as the capacitor C140 of the first DC link 140. For example, an electrolytic condenser is widely used as the capacitor C140 of the first DC link 140.

Sufficient electric energy should be stored in the capacitor C140 of the first DC link 140 D at the start of operation of the motor driving apparatus 1 so that the first DC link 140 may supply DC power to the inverter circuit 300. However, when DC power rectified by the first rectifier 120 is directly supplied to the capacitor C140 of the first DC link 140 at the start of the operation of the motor driving apparatus 1, the magnitude of current flowing to the capacitor C140 is so large that the entire high-voltage power circuit 101 may be damaged.

To prevent damage to the entire high-voltage power circuit 101, the first DC link 140 may include an additional inrush circuit 141 configured to charge the capacitor C140 with electric energy at the start of the operation of the motor driving apparatus 1.

The inrush circuit 141 may include a switch Q141, which is provided between the power-factor corrector 130 and the first DC link 140, and a resistor R141, which is provided on a bypass line between the first rectifier 120 and the first DC link 140.

The switch Q141 of the inrush circuit 141 gets turned on and off in response to an initial charging signal IRP of the control circuit 200. Specifically, the switch Q141 of the inrush circuit 141 gets turned off during initial charging of the capacitor C140 of the first DC link 140. When the switch Q141 of the inrush circuit 141 is turned off, DC power of the first rectifier 120 is supplied to the capacitor C140 of the first DC link 140 through the resistor R141 of the inrush circuit 140. In this case, current flowing from the first rectifier 120 to the capacitor C140 of the first DC link 140 is restricted by the resistor R141 of the inrush circuit 140.

In addition, when the initial charging of the capacitor C140 of the first DC link 140 is completed, the switch Q141 of the inrush circuit 141 gets turned on. When the switch Q141 of the inrush circuit 141 is turned on, DC power of the first rectifier 120 is supplied to the capacitor C140 of the first DC link 140 through the power-factor corrector 130.

After the capacitor C140 of the first DC link 140 is initially charged, the first DC link 140 may supply electric energy stored in the capacitor C140 to the inverter circuit 300, and receive electric energy through the first rectifier 120 from the external power source ES.

The high-voltage sensor 150 may be provided at a rear end of the first DC link 140, measure a voltage value of DC power output by the first DC link 140, and output a high-voltage detection signal HVD corresponding to the measured voltage value. Here, the high-voltage detection signal HVD may constitute first sensing data SD1 to be provided to the control circuit 100, along with low-voltage detection signals LVD1 to LVD7 to be described below.

The high-voltage sensor 150 may include a voltage divider R151 and R152 and an operational amplifier (OP AMP) 0150.

The voltage divider R151 and R152 includes a pair of resistors R151 and R152, which are provided between output terminals of the first DC link 140 and connected in series to each other. Further, the voltage divider R151 and R152 receives the output voltage of the first DC link 140 and outputs a voltage divided by the pair of resistors R151 and R152.

The OP AMP 0150 receives the voltage divided by the voltage divider R151 and R152 and outputs a high-voltage detection signal HVD corresponding to the input voltage.

Although an example of the high-voltage power circuit 101 has been described above, the present invention is not limited thereto. Various implementation circuits for implementing functions of the high-voltage power circuit 101 may be provided.

The low-voltage power circuit 102 may convert high-voltage AC power supplied from the external power source ES into high-voltage DC power, convert the high-voltage DC power into low-voltage DC power again, and output the converted low-voltage DC power.

The low-voltage power circuit 102 may include a second rectifier 160 configured to convert AC power supplied from the external power source ES into DC power, a second DC link 170 configured to remove ripple in DC power output by the second rectifier 160, a DC-DC converter 180 configured to convert a voltage of the DC power output by the second DC link 170 into a plurality of voltages, and a plurality of low-voltage sensors 190 configured to measure voltage values of low-voltage DC power into which the voltage is converted. The low-voltage power circuit 102 is not limited to the second rectifier 160, the second DC link 170, the DC-DC converter 180, and the low-voltage sensor 190, which are shown in FIG. 4, and may further include various additional circuits, such as an overvoltage protection circuit.

The second rectifier 160 receives AC power from which noise has been removed by the EMI filter 110, and converts the received AC power into DC power. In this case, since the low-voltage power circuit 102 drops a voltage using the DC-DC converter 180, the second rectifier 160 may receive AC power from any one of a pair of output terminals of the EMI filter 110. As a result, an effective value of a voltage of AC power supplied to the second rectifier 160 may be half an effective value of a voltage of AC power supplied from the external power source ES.

The second rectifier 160 may include a diode bridge including four diodes D161, D162, D163, and D164. Specifically, a pair of diodes D161 and D162 are connected in series to each other, a pair of diodes D163 and D164 are connected in series to each other, and the pair of diodes D161 and D162 are connected in parallel to the pair of diodes D163 and D164.

AC power is input from the EMI filter 110 through nodes at which the pair of diodes D161 and D162 are connected in series to each other and the pair of diodes D163 and D164 are connected in series to each other. DC power is output through nodes at which the pair of diodes D161 and D162 are connected in parallel to the pair of diodes D163 and D164.

Furthermore, all of the four diodes D161, D162, D163, and D164 are disposed such that current flows in the same direction. For example, as shown in FIG. 6, the four diodes D161, D162, D163, and D164 may be disposed to block the flow of current from an upper side of the drawing to a lower side thereof and pass the flow of current from the lower side of the drawing to the upper side thereof.

As a result, a DC current flows out from cathode terminals of the pair of diodes D161 and D162 and the pair of diodes D163 and D164 and flows into anode terminals of the pair of diodes D161 and D162 and the pair of diodes D163 and D164. Further, the cathode terminals of the pair of diodes D161 and D162 and the pair of diodes D163 and D164 become positive terminals P of the second rectifier 160, and the anode terminals of the pair of diodes D161 and D162 and the pair of diodes D163 and D164 become negative terminals N of the second rectifier 160.

Due to the above-described second rectifier 160, AC power in which a direction in which current flows and a direction in which a voltage is applied are changed over time is converted into DC power in which a voltage is applied in one direction and current flows in the direction in which the voltage is applied.

The second DC link 170 is provided at a rear end of the second rectifier 160 and receives DC power rectified by the second rectifier 160. Further, the second DC link 170 removes ripple included in a voltage of the DC power and outputs a smoothed DC voltage.

The second DC link 170 may include at least one capacitor C170 configured to remove the ripple included in the voltage of the DC power. Although FIG. 5 illustrates one capacitor C170, a plurality of capacitors may be connected to one another in parallel.

In this case, the second DC link 170 may convert the DC power rectified by the second rectifier 160 into electric energy, store the electric energy, and supply the stored electric energy to the control circuit 200 and the inverter circuit 300.

The DC-DC converter 180 receives DC power from the second DC link 170, drops a voltage of the DC power, and outputs DC power having the dropped voltage. In this case, the DC-DC converter 180 may drop the voltage of the DC power to various voltages as needed and output DC voltage having various voltages.

The DC-DC converter 180 may adopt various circuits to stably drop and output the voltage of the DC power. For example, the DC-DC converter 180 may adopt a forward converter shown in FIG. 6.

A voltage of DC power output by the forward converter is changed due to not only an on-time duty ratio of a switch included in the forward converter but also a ratio of the number of turns of a primary coil to the number of turns of a secondary coil. Accordingly, by changing the number of turns of the secondary coil, the forward converter may output a plurality of voltages.

When the forward converter is adopted, the DC-DC converter 180 may include an input terminal 181 through which DC power is received and an output terminal 182 through which DC voltage having a dropped voltage is output. Further, the output terminal 182 may include first to seventh output terminals 182-1, 182-2, . . . , and 182-7 configured to output different DC voltages. Specifically, the first to seventh output terminals 182-1, 182-2, . . . , and 182-7 may output first to seventh low-voltage DC powers LV1 to LV7, respectively.

The input terminal 181 includes a primary coil L181 configured to transmit DC power of the second DC link 170 to the output terminal 182 and a switch Q181 configured to control current flowing to the primary coil L181.

The switch Q181 of the input terminal 181 gets turned on and off in response to a voltage conversion signal CON of the control circuit 200. When the switch Q181 is turned on, current flows to the primary coil L181. When the switch Q181 is turned off, current does not flow to the primary coil L181. As described above, since current of the primary coil L181 fluctuates due to on/off operation of the switch Q181, current may be induced to the secondary coils 182-1, 182-2, . . . , and 182-7 included in the output terminal 182.

As described above, the output terminal 182 may include the first to seventh output terminals 182-1, 182-2, . . . , and 182-7, which may output DC power having different voltages. For example, the first to sixth output terminals 182-1, 182-2, . . . , and 182-6 may output DC power having a voltage of 12V, and the seventh output terminal 182-7 may output DC power having a voltage of 5 V.

The first to seventh output terminals 182-1, 182-2, . . . , and 182-7 may respectively include secondary coils L182a-1, L182a-2, . . . , and L182a-7 configured to receive energy from the primary coil L181, pairs of diodes D182a-1 and D182b-1, D182a-2 and D182b-2, . . . , and D182a-7 and D182b-7 configured to guide the flow of current, inductors L182b-1, L182b-2, . . . , and L182b-7 configured to remove high-frequency ripple caused by on/off operation of the switch Q181 of the input terminal 181, and capacitors C182-1, C182-2, . . . , and C182-7 configured to store electric energy provided from the input terminal 181.

In this case, the numbers of turns of the secondary coils L182a-1, L182a-2, . . . , and L182a-7 may vary according to voltages output by the first to seventh output terminals 182-1, 182-2, . . . , and 182-7, respectively.

For example, when the first to sixth output terminals 182-1, 182-2, . . . , and 182-6 output DC power having a voltage of 12V and the seventh output terminal 182-7 outputs DC power having a voltage of 5 V, a ratio of the number of turns of each of the secondary coils L182a-1, L182a-2, . . . , and L182a-6 included in the first to sixth output terminals 182-1, 182-2, . . . , and 182-6 to the number of turns of the secondary coil L182a-7 included in the seventh output terminal 182-7 may be 12:5.

As described above, the DC-DC converter 180 may receive DC power of the second DC link 170 and output first to seventh low-voltage DC powers LV1 to LV7 having different voltages.

Although the DC-DC converter 180 has adopted the forward converter, the present invention is not limited thereto. For example, the DC-DC converter 180 may adopt a buck converter capable of converting a DC voltage, a boost converter, a buck-boost converter, a flyback converter, a push-pull converter, a half-bridge converter, a full-bridge converter, or the like.

The low-voltage sensor 190 may include first to seventh low-voltage sensors 190-1, 190-2, . . . , and 190-7. The first to seventh low-voltage sensors 190-1, 190-2, . . . , and 190-7 may be provided to correspond to a plurality of output terminals 182-1, 182-2, . . . , and 182-7 of the DC-DC converter 180, respectively. The low-voltage sensor 190 may measure a voltage value of DC power output by the DC-DC converter 180 and output low-voltage detection signals LVD1, LVD2, . . . , and LVD7 corresponding to the measured voltage value. Here, the low-voltage detection signals LVD1 to LVD7 constitute first sensing data SD1 provided to the control circuit 100 along with the above-described high-voltage detection signal HVD.

A plurality of low-voltage sensors 190-1, 190-2, . . . , and 190-7 may include voltage dividers R191-1 and R192-1, R191-2 and R192-2, . . . , and R191-7 and R192-7, respectively.

For example, the first low-voltage sensor 190-1 includes a first voltage divider R191-1 and R192-1, which includes a pair of resistors R191-1 and R192-1 connected in series to each other. Further, the first voltage divider R191-1 and R192-1 receives an output voltage of a first output terminal 182-1 of the DC-DC converter 180 and outputs a voltage divided by the pair of resistors R191-1 and R192-1.

Since configurations and operations of the second to seventh low-voltage sensors 190-2, 190-3, . . . , and 190-7 are the same as those of the first low-voltage sensor 190-1, descriptions thereof are omitted.

As described above, the low-voltage detection signals LVD1 to LVD7 output by the voltage dividers R191-1 and R192-1, R191-2 and R192-2, . . . , and R191-7 and R192-7 of the low-voltage sensor 190 are applied to the control circuit 200.

Accordingly, voltage levels of the low-voltage detection signals LVD1 to LVD7 are limited to voltage levels that may be input to the control circuit 200.

For example, when first to sixth output terminals 182-1, 182-2, . . . , and 182-6 of the DC-DC converter 180 may output DC power having a voltage of 12V and a seventh output terminal 182-7 of the DC-DC converter 180 outputs DC power having a voltage of 5 V, the control circuit 200 may receive a voltage of 0 V to 5 V.

In this case, to detect an undervoltage and an overvoltage of the control circuit 200, a reference voltage of the control circuit 200 may be set to 2.5 V.

Thus, the low-voltage sensor 190 converts a normal output voltage of the DC-DC converter 180 into the reference voltage of 2.5 V and outputs the reference voltage of 2.5 V by using the voltage dividers R191-1 and R192-1, R191-2 and R192-2, . . . , and R191-7 and R192-7.

For example, as shown in FIG. 7A, when the first output terminal 182-1 of the DC-DC converter 180 outputs a normal output voltage of 12V, the first low-voltage sensor 190-1 outputs the reference voltage of 2.5 V. To this end, a ratio between the pair of resistors R191-1 and R192-1 included in the first low-voltage sensor 190-1 may be 19:5.

In addition, as shown in FIG. 7B, when the seventh output terminal 182-7 of the DC-DC converter 180 outputs a normal output voltage of 5 V, the seventh low-voltage sensor 190-7 outputs the reference voltage of 2.5 V. To this end, a ratio between the pair of resistors R191-7 and R192-7 included in the seventh low-voltage sensor 190-7 may be 1:1.

As described above, the power circuit 100 includes a high-voltage power circuit 101 and a low-voltage power circuit 102. The high-voltage power circuit 101 may output high-voltage DC power to be supplied to the inverter circuit 300, and the low-voltage power circuit 102 may output low-voltage DC power having various voltages to be supplied to the control circuit 200 and the inverter circuit 300.

Next, the inverter circuit 300 will be described.

FIG. 8 illustrates an inverter circuit included in a motor driving apparatus according to an embodiment. FIG. 9 illustrates configuration of a parameter storage unit included in the inverter circuit shown in FIG. 8.

As shown in FIG. 8, an inverter circuit 300 includes an inverter 320, which includes a plurality of switches Q321 to Q326 and is configured to supply driving power DV to the motor 400, a current sensor 330 configured to measure a driving current supplied from the inverter 320 to the motor 400, a gate driver 310 configured to turn on and off the plurality of switches Q321 to Q326 included in the inverter 320, and an auxiliary storage unit 340 configured to store various motor parameters related to the motor 400 driven by the inverter 320.

The gate driver 310 may receive first to sixth low-voltage DC powers LV1 to LV7 from the power circuit 100 and receive six pulse-width modulation signals PWM from the control circuit 200. Further, using the first to sixth low-voltage DC powers LV1 to LV7, the gate driver 310 may generate an inverter driving signal DRV for turning on and off a plurality of switches Q321 to Q326 included in the inverter 320 based on the six pulse-width modulation signals PWM, and output the generated inverter driving signal DRV to the inverter 320.

Generally, the pulse-width modulation signal PWM output by the control circuit 200 has a voltage of 0 V to 5 V, and a signal for turning on and off the plurality of switches Q321 to Q326 included in the inverter 320 has a voltage of 0 V to 12V. Accordingly, it is difficult for the pulse-width modulation signal PWM of the control circuit 200 to turn on and off the plurality of switches Q321 to Q326 included in the inverter 320.

For this reason, the gate driver 310 is provided between the control circuit 200 and the inverter 320. The gate driver 310 amplifies the pulse-width modulation signal PWM of the control circuit 200 and drives the plurality of switches Q321 to Q326 included in the inverter 320. DC power having a voltage of 12V may be applied to the gate driver 310 to turn on and off the plurality of switches Q321 to Q326 included in the inverter 320.

The inverter 320 receives high-voltage DC power HV from the power circuit 100 and receives an inverter driving signal DRV from the gate driver 310. Further, the inverter 320 converts high-voltage DC power HV into high-voltage AC power in response to the inverter driving signal DRV and supplies the high-voltage AC power to the motor 400. In other words, the inverter 320 supplies driving power DV to the motor 400 in response to the inverter driving signal DRV.

The inverter 320 may adopt a 6-switch inverter including six switches Q321 to Q326.

For example, as shown in FIG. 8, the inverter 320 may include three switch pairs Q321 and Q322, Q323 and Q324, and Q325 and Q326. In this case, the switch pairs Q321 and Q322, Q323 and Q324, and Q325 and Q326 include a pair of serially connected switches Q321 and Q322, a pair of serially connected switches Q323 and Q324, and a pair of serially connected switches Q325 and Q326, respectively.

Specifically, the first switch pair Q321 and Q322 may include a first switch Q321 and a second switch Q322 that are connected in series to each other, the second switch pair Q323 and Q324 may include a third switch Q323 and a fourth switch Q324 that are connected in series to each other, and the third switch pair Q325 and Q326 may include a fifth switch Q325 and a sixth switch Q326 that are connected in series to each other. Further, the three switch pairs Q321 and Q322, Q323 and Q324, and Q325 and Q326 may be connected in parallel to one another.

In this case, high-voltage DC power HV of the power circuit 100 is supplied to two power supply nodes P and N at which the three switch pairs Q321 and Q322, Q323 and Q324, and Q325 and Q326 are connected to one another. Further, driving power DV is supplied to the motor 400 from three output nodes U, V, and W at which both of the switches in each of the switch pairs Q321 and Q322, Q323 and Q324, and Q325 and Q326, that form the three switch pairs, are connected in series to each other. Further, an inverter driving signal DRV of the gate driver 310 is applied to an input gate of each of the six switches Q321, Q322, Q323, Q324, Q325, and Q326.

The six switches Q321, Q322, Q323, Q324, Q325, and Q326 included in the inverter 320 get sequentially turned on and off in response to the inverter driving signal DRV of the gate driver 310. High-voltage DC power HV is converted into driving power DV due to on/off operation of the six switches Q321, Q322, Q323, Q324, Q325, and Q326, and the driving power DV is supplied to the motor 400. In this case, the driving power DV may be AC power.

In this case, the six switches Q321, Q322, Q323, Q324, Q325, and Q326 included in the inverter 320 may adopt insulated gate bipolar transistors (IGBTs) or power field-effect transistors (power FETs) configured to block or conduct a high-voltage high current.

Furthermore, although an inverter 320 adopting the 6-switch inverter has been described above, the present invention is not limited thereto. The inverter 320 may adopt a multi-level inverter, such as a T-type neutral point clamped inverter, a diode-clamped inverter, and the like, to reduce loss.

As described above, the inverter 320 converts high-voltage DC power HV into driving power DV and supplies the driving power DV to the motor 400.

The current sensor 330 measures current values Ia, Ib, and Ic of the driving power DV output by the inverter 320. Specifically, the current sensor 330 measures a first driving current Ia output through a first output terminal U, a second driving current Ib output through a second output terminal V, and a third driving current Ic output through a third output terminal W. Further, the current sensor 330 may measure two driving currents of the first, second, and third driving currents Ia, Ib, and Ic, and the one remaining driving current may be calculated by the control circuit 200 to be described below.

A high current of several amperes (A) to several hundred A is supplied to the motor 400. To detect the high current, the current sensor 330 may include a current transformer (CT) configured to proportionally reduce the magnitude of a driving current and an ampere meter configured to detect the magnitude of the proportionally reduced current. In other words, the current sensor 330 may proportionally reduce the magnitude of the driving current using the CT and measure the magnitude of the proportionally reduced current to detect the driving current.

Here, values Ia, Ib, and Ic of the driving current measured by the current sensor 330 constitute second sensing data SD2 along with position information θ of the rotor (not shown), which is detected by the hall sensor 410 of the motor 400.

The auxiliary storage unit 340 may store various motor parameters related to the motor 400 driven by the inverter 320. For example, the auxiliary storage unit 340 may store motor parameters, such as a resistance of a wound wire included in the motor 400, an inductance of a wire-wound coil, and a magnetic flux of a permanent magnet of the rotor (not shown) included in the motor 400.

Furthermore, the auxiliary storage unit 340 may transmit the motor parameters to the control circuit 200 through a data bus BUS or receive the motor parameters from the control circuit 200 through the data bus BUS.

As shown in FIG. 9, the auxiliary storage unit 340 may include a memory 342, a communication interface 343, and a memory controller 341.

The memory 342 may store control programs for controlling operation of the auxiliary storage unit 340, control data, and motor parameters.

The memory 342 may include a non-volatile memory, such as read-only memory (ROM), erasable programmable ROM (EPROM), and electrically erasable programmable ROM (EEPROM).

The non-volatile memory may operate as an auxiliary memory apparatus of a volatile memory and store motor parameters or control programs and control data for implementing the memory controller 341. Further, even if power supply of an electronic apparatus gets turned off, data stored in the non-volatile memory is retained.

The communication interface 343 may transmit or receive the motor parameters to and from the control circuit 200 through the data bus BUS according to a predetermined communication protocol. For example, the communication interface 343 may communicate with the control circuit 200 according to an Inter-Integrated Circuit (I2C) protocol, a Serial Peripheral Interface (SPI) protocol, or a Universal Asynchronous Receive-Transmit (UART) protocol.

In particular, the I2C protocol is widely used to read data from the non-volatile memory or write data to the non-volatile memory. When the I2C protocol is used, the communication interface 343 may transmit and receive data through a serial clock (SCL) line and a serial data (SDA) line.

The memory controller 341 controls operations of the memory 342 and the communication interface 343, and manages the motor parameters stored in the memory 342.

For example, the memory controller 341 may receive the motor parameters from the control circuit 200 through the communication interface 343, and store the motor parameters in the memory 342. Further, the memory controller 341 may load the motor parameters from the memory 342 and transmit the motor parameters of the memory 342 through the communication interface 343 to the control circuit 200.

Although the memory 342, the communication interface 343, and the memory controller 341 have been described separately, the memory 342, the communication interface 343, and the memory controller 341 may be implemented as a single chip. In other words, one chip may perform all of the operations of storing the motor parameters, communicating with the control circuit 200, and managing the motor parameters.

For example, the memory 342 may be implemented as a non-volatile block provided on a single chip. The memory controller 341 and the communication interface 343 may be implemented as hardware, such as a field-programmable gate array (FPGA) or an application specific integrated circuit (ASIC) or as software stored in the memory 342.

As described above, the inverter circuit 300 includes the gate driver 310, the inverter 320, the current sensor 330, and an auxiliary storage unit 340. The inverter circuit 300 may supply driving power for rotating the motor 400 and store motor parameters of the motor 400. Further, the inverter circuit 300 may communicate motor parameters with the control circuit 200.

Next, the control circuit 200 will be described.

FIG. 10 illustrates a control circuit included in a motor driving apparatus according to an exemplary embodiment. Further, FIG. 11 illustrates a configuration of an inverter controller included in the control circuit shown in FIG. 10, and FIGS. 12, 13, and 14 are diagrams for describing operation of a main controller included in the control circuit shown in FIG. 10.

As shown in FIG. 10, a control circuit 200 may include an inverter controller 220 configured to control a motor driving operation of an inverter circuit 300, a main controller 210 configured to control a power supply operation of a power circuit 100, the main controller 210 configured to manage the power circuit 100 and the inverter circuit 300, a main storage unit 240 configured to store motor parameters, and a communication interface 250 configured to communicate with the inverter circuit 300. In addition, the control circuit 200 may further include a multiplexer 211 configured to multiplex a high-voltage detection signal HVD and low-voltage detection signals LVD1 to LVD7.

In this case, the inverter controller 220, the main controller 210, the main storage unit 240, and the communication interface 250 may be implemented as one first chip 201. For example, the main storage unit 240 may be implemented as a non-volatile memory, and the inverter controller 220, the main controller 210, and the communication interface 250 may be implemented as hardware, such as a field-programmable gate array (FPGA) or an application specific integrated circuit (ASIC), or as software stored in the main storage unit 240.

For example, the first chip 201 may include a processor block and a volatile memory block, which are configured to implement the inverter controller 220, the main controller 210, and the communication interface 250, and may include a non-volatile memory block configured to implement the main storage unit 240.

In another example, the first chip 201 may include control programs configured to implement the inverter controller 220, the main controller 210, and the communication interface 250, a non-volatile memory block configured to store control data therein and implement the main storage unit 240, and a processor block and a volatile memory block configured to perform a calculation operation based on the control programs and the control data.

However, the present invention is not limited thereto, and the main storage unit 240 may be implemented as a chip separate from the inverter controller 220, the main controller 210, and the communication interface 250. In addition, the inverter controller 220 and the main storage unit 240 may be implemented as separate chips, and the main controller 210 and the communication interface 250 may be implemented as a single chip.

Furthermore, the multiplexer 211 may be implemented as a second chip 202, which is separate from the first chip 201 configured to implement the inverter controller 220, the main controller 210, the main storage unit 240, and the communication interface 250.

The inverter controller 220 receives second sensing data SD2 from the inverter circuit 300, and receives a target speed command ω* from a main control circuit (not shown) of an external apparatus (not shown) in which a motor driving apparatus 1 is installed.

Generally, the motor driving apparatus 1 is not provided independently but attached to a household appliance, such as a refrigerator, a washing machine, an air conditioner, and the like. That is, the motor driving apparatus 1 may be a component of the refrigerator, the washing machine, the air conditioner, or the like. For example, in the case of a refrigerator, the motor driving apparatus 1 may drive a motor configured to drive a compressor included in the refrigerator. In the case of a washing machine, the motor driving apparatus 1 may drive a motor configured to rotate a drum included in the washing machine. Further, in the case of an air conditioner, the motor driving apparatus 1 may drive a motor configured to drive a compressor or a circulating fan included in the air conditioner.

In addition, the motor driving apparatus 1 may receive a target speed command ω* from a main control circuit (not shown) included in the household appliance, such as the refrigerator, the washing machine, the air conditioner, and the like. In this case, the main control circuit (not shown) may be a apparatus configured to control the overall operation of the refrigerator, the washing machine, the air conditioner, or the like.

For example, in the case of a refrigerator, a main control circuit of the refrigerator may output a control signal for driving a compressor and a target speed command ω* related to the rotation of the motor to the motor driving apparatus 1 depending on a temperature of a refrigeration compartment. Further, in the case of a washing machine, a main control circuit of the washing machine may output a control signal for rotating a drum and a target speed command ω* related to the rotation of the motor to the motor driving apparatus 1 depending on a washing stroke.

The inverter controller 220 outputs a pulse-width modulation signal PWM for controlling the rotation of the motor 400 based on second sensing data SD2 and the target speed command ω*.

As described above, the second sensing data SD2 includes current values Ia, Ib, and Ic of driving power DV output by the current sensor 330 of the inverter circuit 300 and rotor position information θ output by the hall sensor 410 of the motor 400.

The inverter controller 220 may calculate a rotation speed w of the motor 400 based on the rotor position information θ, and calculate a driving voltage to be applied to the motor 400 based on the calculated rotation speed w and the current values Ia, Ib, and Ic of the driving power DV. Further, the inverter controller 220 may generate a pulse-width modulation signal PWM based on the driving voltage to be applied to the motor 400.

For example, as shown in FIG. 11, the inverter controller 220 may include a speed calculator 221, a coordinate system converter 222, a speed controller 223, a current controller 224, an inverse coordinate system converter 225, and a pulse-width modulator 226.

The speed calculator 221 calculates the rotation speed ω of the motor 400 based on the rotor position information θ included in the motor 400. Here, the rotor position information θ may be input from the hall sensor 410 included in the motor 400 as described above.

In addition, when the motor 400 does not include the hall sensor 410, the speed calculator 221 may calculate the rotation speed ω of the motor 400 based on a driving current value Iabc detected by the current sensor 330. The calculation of a rotation speed of a motor MO by using the driving current value Iabc is referred to as 'sensorless control'.

Specifically, the speed calculator 221 may differentiate the rotor position information θ with respect to time and calculate the rotation speed ω of the motor 400. For example, when the speed calculator 221 receives the rotation position information θ every predetermined sampling intervals, the speed calculator 221 may calculate the rotation speed ω of the motor 400 by dividing a difference between rotor position information θ input at a previous sampling time and currently input rotor position information θ by the sampling interval.

The coordinate system converter 222 converts a 3-phase driving current Iabc into a rotor-based dq-axis current Idq based on the rotor position information θ.

Here, a d-axis means an axis corresponding to a direction of a magnetic field generated by the rotor of the motor 400, and a q-axis means an axis that deviates by an angle of 90° from the direction of the magnetic field generated by the rotor of the motor 400. Here, the angle of 90° is not a mechanical angle of the rotor but refers to an electrical angle obtained by converting an angle between adjacent N poles or adjacent S poles included in the rotor so that the angle is out of 360 degrees.

Further, a d-axis current Id denotes a current component that is configured to generate a d-axial magnetic field and is from the driving current Iabc. The stator of the motor 400 includes a plurality of coils. When current is supplied to the coils, the coils generate a magnetic field. In this case, a current component that is configured to generate the d-axial magnetic field and is from the current supplied to the coil becomes the d-axis current Id.

In addition, a q-axis current Iq denotes a current component that is configured to generate a q-axial magnetic field and is from the driving current Iabc. In other words, a current component that is configured to generate the q-axial magnetic field and is from the current supplied to the coils becomes the q-axis current Iq.

Specifically, the coordinate system converter 222 may calculate the dq-axis current Idq from the 3-phase driving current Iabc by using Equation 1:

$$\begin{bmatrix} I_d \\ I_q \end{bmatrix} = \begin{bmatrix} \cos\theta & \sin\theta \\ -\sin\theta & \cos\theta \end{bmatrix} \begin{bmatrix} 1 & 0 & 0 \\ 0 & 1/\sqrt{3} & -\frac{1}{\sqrt{3}} \end{bmatrix} \begin{bmatrix} I_a \\ I_b \\ I_c \end{bmatrix}$$ [Equation 1]

(Here, Id denotes the d-axis current, Iq denotes the q-axis current, θ denotes a rotational displacement of the rotor, Ia denotes an a-phase current, Ib denotes a b-phase current, and Ic denotes a c-phase current.)

The speed controller 223 compares an externally input speed command ω* with the rotation speed ω of the motor 400 and outputs a dq-axis current command Idq* based on the comparison result. Specifically, the speed controller 214 may output a dq-axis current to be supplied to the motor 400 to reduce a difference between the speed command ω* and the rotation speed w.

For example, the q-axis current command Iq* is directly related to rotational force (torque) generated by the motor 400. In other words, as the q-axis current command Iq* increases, the rotational force generated by the motor 400 increases. Further, a d-axis current command Id* is a component independent of the rotational force (torque) generated by the motor 400. Accordingly, the speed controller 223 may output the q-axis current command Iq* based on the difference between the speed command ω* and the rotation speed ω, and output the d-axis current command Id* as "0" to reduce energy loss.

The speed controller 223 may include at least one of a proportional controller, a proportional-integral controller, and a proportional integral-derivative controller.

The current controller 224 compares the dq-axis current command Idq* output by the speed controller 223 with the dq-axis current Idq of the motor 400 and outputs a dq-axis voltage command Vdq* based on the comparison result. Specifically, the current controller 224 outputs a dq-axis voltage to be applied to the motor 400 to reduce a difference between the dq-axis current command Idq* and the dq-axis driving current Idq.

Here, the dq-axis current Idq is a dq-axis current Idq output by the above-described coordinate system converter 222. Further, the dq-axis voltage command Vdq* refers to a voltage corresponding to the dq-axis current command Idq*. In other words, the dq-axis voltage command Vdq* refers to a dq-axis voltage to be applied to the motor 400 to supply the dq-axis current command Idq* to the motor 400.

The current controller 224 may also include at least one of a proportional controller, a proportional-integral controller, and a proportional integral-derivative controller.

The inverse coordinate system converter 225 converts the dq-axis voltage command Vdq* into a driving voltage command Vabc* based on the rotor position information θ. The dq-axis voltage command Vdq* refers to a dq-axis voltage to be applied to the motor 400 to supply the dq-axis current command Idq* to the motor 400 as described above.

Specifically, the inverse coordinate system converter 225 may calculate a driving voltage command Vabc* from the dq-axis voltage command Vdq* by using Equation 2. Specifically, the inverse coordinate system converter 225 outputs a driving voltage to be actually applied to a first output terminal U, a second output terminal V, and a third output terminal W of the motor MO to apply the dq-axis voltage command Vdq* to the motor MO.

$$\begin{bmatrix} V_a \\ V_b \\ V_c \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} V_d \\ V_q \end{bmatrix} \quad \text{[Equation 2]}$$

(Here, Vd denotes a d-axis voltage, Vq denotes a q-axis voltage, θ denotes the rotational displacement of the rotor, Va denotes an a-phase voltage, Vb denotes a b-phase voltage, and Vc denotes a c-phase voltage.)

The pulse-width modulator 226 outputs a pulse-width modulation signal PWM to be provided to the inverter circuit 300 based on the output (i.e., the driving voltage command Vabc*) of the inverse coordinate system converter 225. Specifically, the pulse-width modulator 226 may pulse-width modulate (PWM) each of the a, b, and c-phase voltages of the driving voltage command Vabc* and generate a pulse-width modulation signal PWM.

As described above, the inverter controller 220 generates the pulse-width modulation signal PWM for rotating the motor at the speed command ω* based on the rotor position information θ of the motor 400, the driving current Iabc supplied to each phase of the motor 400, and a speed command ω* input from an external apparatus, and outputs the pulse-width modulation signal PWM to the inverter circuit 300.

The main storage unit 240 may store control programs and control data for implementing the inverter controller 220 and the main controller 210.

In particular, the main storage unit 240 may store motor control programs and motor parameters, which are related to all motors 400 that may be driven by the motor driving apparatus 1. In other words, the main storage unit 240 may store a plurality of motor control programs and a plurality of motor parameters.

The main storage unit 240 may include a non-volatile memory, such as read-only memory (ROM), erasable programmed ROM (EPROM), and electrically erasable programmable ROM (EEPROM).

The non-volatile memory may operate as an auxiliary memory apparatus of a volatile memory, store the motor parameters, and store control programs and control data for implementing the inverter controller 220 and the main controller 210. Further, even if power supply of the motor driving apparatus 1 gets turned off, data stored in the non-volatile memory may be retained.

The communication interface 250 may transmit or receive the motor parameter to and from the inverter circuit 300 through the data bus BUS according to a predetermined communication protocol. For example, the communication interface 250 may communicate with the inverter circuit 300 according to an Inter-Integrated Circuit (I2C) protocol, a Serial Peripheral Interface (SPI) protocol, or a Universal Asynchronous Receive-Transmit (UART) protocol.

In particular, the I2C protocol is widely used to read data from a non-volatile memory or write data to a non-volatile memory. When the I2C protocol is used, the communication interface 343 may transmit and receive data through a serial clock (SCL) line and a serial data (SDA) line.

The main controller 210 may control a power supply operation of the power circuit 100.

As shown in FIG. 12, the multiplexer 211 receives first sensing data SD1 from the power circuit 100 and receives selection signals Sel1, Sel2, and Sel3 from the main controller 210. Further, the multiplexer 211 multiplexes the first sensing data SD1 based on the selection signals Sel1, Sel2, and Sel3, and provides the multiplexed first sensing data SD1 to the main controller 210.

As described above, the first sensing data SD1 includes first to seventh low-voltage detection signals LVD1 to LVD7 and a high-voltage detection signal HVD.

The multiplexer 211 selects any one of the first to seventh low-voltage detection signals LVD1 to LVD7 and the high-voltage detection signal HVD based on the selection signals Sel1, Sel2, and Sel3, and outputs the selected signal to the main controller 210.

For example, when the selection signals Sel1, Sel2, and Sel3 are [0, 0, 0], the multiplexer 211 may output the first low-voltage detection signal LVD1 to the main controller 210. When the selection signals Sel1, Sel2, and Sel3 are [0, 0, 1], the multiplexer 211 may output the second low-voltage detection signal LVD2 to the main controller 210. In the above-described manner, the multiplexer 211 may output the third low-voltage detection signal LVD3, the fourth low-voltage detection signal LVD4, the fifth low-voltage detection signal LVD5, the sixth low-voltage detection signal LVD6, the seventh low-voltage detection signal LVD7, and the high-voltage detection signal HVD to the main controller 210 based on the selection signals Sel1, Sel2, and Sel3.

Although the above-described multiplexer 211 receives three selection signals Sel1, Sel2, and Sel3 and eight sensing signals LVD1, LVD2, . . . , LVD7 and HVD and outputs one sensing signal, the multiplexer 211 is only an example and the present invention is not limited thereto.

The number of sensing signals of the multiplexer 211 and the number of selection signals may be changed according to the number of DC power outputs that may be independently output by the power circuit 100. For example, when the power circuit 100 independently outputs 10 DC power outputs, the multiplexer 211 may receive 10 sensing signals and receive four selection signals.

The main controller 210 outputs, to the multiplexer 211, the selection signals Sel1, Sel2, and Sel3 for selecting any one of the first to seventh low-voltage detection signals LVD1 to LVD7 and the high-voltage detection signal HVD, and receives any one of the first to seventh low-voltage detection signals LVD1 to LVD7 and the high-voltage detection signal HVD from the multiplexer 211.

In addition, the main controller 210 outputs a power-factor correction signal PFC for controlling the power-factor corrector 130 of the power circuit 100, a voltage conversion signal CON for controlling the DC-DC converter 180, and an initial charging signal IRP for controlling the initial charging of the first DC link 140 based on the first to seventh low-voltage detection signals LVD1 to LVD7 and the high-voltage detection signal HVD.

Specifically, the main controller 210 generates a power-factor correction signal PFC such that a phase of an AC voltage supplied from the external power source ES is equal to a phase of current supplied to the first DC link 140. The main controller 210 generates a voltage conversion signal CON such that DC power having a predetermined voltage is output from the DC-DC converter 180. Further, the main controller 210 generates an initial charging signal IRP such that the first DC link 140 is initially charged until a voltage value of high-voltage power output by the first DC link 140 reaches a predetermined voltage value.

Furthermore, the power-factor correction signal PFC, the voltage conversion signal CON, and the initial charging signal IRP, which are generated by the main controller 210, are respectively transmitted to the power-factor corrector 130 of the power circuit 100, the DC-DC converter 180, and the inrush circuit 141.

The main controller 210 may manage the power circuit 100 and the inverter circuit 300. In particular, the main controller 210 may manage the motor parameter stored in the main storage unit 240.

For example, when the supply of power from the external power source ES starts, the main controller 210 may determine whether the power circuit 100 mounted on the main board 100 is operating normally, whether the second card CA2 on which the inverter circuit 300 is mounted is inserted into the main board MB, and whether the auxiliary storage unit 340 included in the inverter circuit 300 is operating normally.

Specifically, the inverter circuit 300 may provide third sensing data SD3 to the control circuit 200 so that the main controller 210 may determine whether the second card CA2 on which the inverter circuit 300 is mounted is inserted into the main board MB.

As shown in FIG. 13, a third detection line SD3_LINE is provided between the control circuit 200 and the inverter circuit 300. One end of the third detection line SD3_LINE may be connected to the main controller 210 of the control circuit 200 and connected to a 5 V low-voltage power source through a pull-up resistor Rpu. Further, another end of the third detection line SD3_LINE may be connected to a ground GND of the inverter circuit 300.

By configuring the circuit as shown in FIG. 13, the main controller 210 may determine whether the second card CA2 on which the inverter circuit 300 is mounted is inserted into the main board MB. That is, the main controller 210 may determine whether the inverter circuit 300 is connected to the power circuit 100.

Specifically, when the second card CA2 on which the inverter circuit 300 is mounted is inserted into the main board MB, a voltage of 0 V may be applied to the main controller 210. When the second card CA2 is not inserted into the main board MB, a voltage of 5 V may be applied to the main controller 210 by the pull-up resistor Rpu.

Further, the main controller 210 may manage the motor parameters stored in the main storage unit 240.

Specifically, the main controller 210 determines whether a motor parameter stored in the main storage unit 240 is identical with a motor parameter stored in the auxiliary storage unit 330 of the inverter circuit 300. When the motor parameter stored in the main storage unit 240 is not identical with the motor parameter stored in the auxiliary storage unit 330, the main controller 210 may store in the main storage unit 240 the motor parameter stored in the auxiliary storage unit 330.

For example, as shown in FIG. 14, the main controller 210 may receive a motor parameter from the auxiliary storage unit 330 of the inverter circuit 300 through the communication interface 250, and store the motor parameter in the main storage unit 240.

In addition, when the motor parameter stored in the main storage unit 240 is not identical with a motor parameter stored in the auxiliary storage unit 330, the main controller 210 may store in the auxiliary storage unit 330 the motor parameter stored in the main storage unit 240.

For example, as shown in FIG. 14, the main controller 210 may load a motor parameter from the main storage unit 240, and transmit the motor parameter to the auxiliary storage unit 330 of the inverter circuit 300 through the communication interface 250.

As described above, the control circuit 200 may control operations of the power circuit 100 and the inverter circuit 300. In particular, the control circuit 200 may manage the motor parameters stored in the inverter circuit 300 and the control circuit 200 through the data bus BUS.

In addition, an operation of the motor driving apparatus 1 to be described below may be interpreted as a control operation of the control circuit 200.

Configuration of the motor driving apparatus 1 has been described thus far.

Hereinafter, operation of the motor driving apparatus 1 will be described.

FIG. 15 illustrates an initial operation of a motor driving apparatus according to an embodiment.

FIG. 16 illustrates a case in which the motor driving apparatus initially charges a first DC link due to the operation shown in FIG. 15. FIGS. 17A, 17B, and 18 illustrate a case in which the motor driving apparatus checks the output of a DC-DC converter according to the operation shown in FIG. 15. Further, FIGS. 19A and 19B illustrate a case in which the motor driving apparatus detects the connection of an inverter circuit according to the operation shown in FIG. 15. FIGS. 20A and 20B illustrate a case in which the motor driving apparatus confirms motor parameters stored in the inverter circuit according to the operation shown in FIG. 15.

An initial operation 600 of a motor driving apparatus 1 when the supply of power from an external power source ES is initiated will be described with reference to FIGS. 15 to 20B.

The motor driving apparatus 1 initially charges a first DC link 140 (610).

When AC power is supplied from the external power source ES, a main controller 210 of a control circuit 100 generates a first initial charging signal IRP1 for initially charging the first DC link 140, and transmits the first initial charging signal IRP1 to an inrush circuit 141 of a power circuit 100.

In response to the first initial charging signal IRP1, as shown in FIG. 16, a switch Q141 of the inrush circuit 141 gets turned off, and an initial charging current I flows from a first rectifier 120 through a resistor R141 of the inrush circuit 141 to the first DC link 140.

Further, due to the initial charging current I, electric energy is supplied to a capacitor C140 of the first DC link 140, and an output voltage of the capacitor C140 increases.

Thereafter, the motor driving apparatus 1 determines whether a voltage value of low-voltage DC power output by a DC-DC converter 180 is within a normal range (620).

The DC-DC converter 180 of the power circuit 100 may output first to seventh low-voltage DC powers LV1, LV2, . . . , and LV7. First to seventh low-voltage sensors 190-1, 190-2, . . . , and 190-7 of the power circuit 100 may measure voltage values of the first to seventh low-voltage DC powers LV1, LV2, . . . , and LV7, and output first to seventh low-voltage detection signals LVD1, LVD2, . . . , and LVD7 corresponding to the measured voltage values.

Furthermore, a multiplexer 211 of a control circuit 200 may provide first to seventh low-voltage detection signals LVD1, LVD2, . . . , and LVD7 to the main controller 210 in response to selection signals Sel1, Sel2, and Sel3 of the main controller 210.

For example, when the selection signals Sel1, Sel2, and Sel3 are [0, 0, 0] as shown in FIG. 17A, the multiplexer 211 outputs the first low-voltage detection signal LVD1 to the main controller 210. In this case, when the selection signals Sel1, Sel2, and Sel3 are [0, 0, 0], it indicates that the main controller 210 outputs voltages of 0 V, 0 V, and 0 V as the output selection signals Sel1, Sel2, and Sel3.

In another example, when the selection signals Sel1, Sel2, and Sel3 are [0, 0, 1] as shown in FIG. 17B, the multiplexer 211 may output the second low-voltage detection signal LVD2 to the main controller 210. In this case, when the selection signals Sel1, Sel2, and Sel3 are [0, 0, 1], it indicates that the main controller 210 outputs voltages of 0 V, 0 V, and 5 V as the selection signals Sel1, Sel2, and Sel3.

The main controller 210 may output the selection signals Sel1, Sel2, and Sel3 for selecting any one of the first to seventh low-voltage detection signals LVD1, LVD2, . . . , and LVD7. The main controller 210 may determine whether a voltage value of low-voltage DC power output by the DC-DC converter 180 is within a normal range based on a sensing signal output by the multiplexer 211.

For example, as shown in FIG. 18, low-voltage DC power supplied to the gate driver 310 may have a normal voltage of 12V, and the gate driver 310 is capable of operating in a voltage range of 6 V to 18 V. However, this only means that the gate driver 310 is not damaged in the voltage range of 6 V to 18 V. It does not mean that the gate driver 310 is capable of normal operation in the voltage range of 6 V to 18 V. The gate driver 310 is capable of normal operation when the voltage value of DC power ranges from 10 V to 14 V.

When a voltage value of the low-voltage detection signal is 10 V to 14 V based on the above-described criteria, the main controller 210 may determine that the voltage value of the low-voltage DC power output by the DC-DC converter 180 is within a normal range.

Further, when the voltage value of the low-voltage detection signal ranges from 6 V to 10 V or ranges from 14 V to 18 V, the main controller 210 may determine that the voltage level of the low-voltage DC power output by the DC-DC converter 180 is abnormal. In addition, the main controller 210 may transmit an abnormal operation message to the main controller 210, and transmit an abnormal operation message to a main control circuit (not shown) of a household appliance (not shown) (e.g., an air conditioner) that includes the motor driving apparatus 1.

As a result, the household appliance (not shown), such as an air conditioner, may display an abnormal operation message to a user.

Further, when the voltage value of the low-voltage detection signal is less than a voltage of 6 V or exceeds a voltage of 18 V, the main controller 210 may determine a failure in the DC-DC converter 180. Further, the main controller 210 may transmit a power failure message to the main controller 210 and stop operation of the power circuit 100.

As a result, operation of the household appliance (not shown), such as a refrigerator, a washing machine, an air conditioner, and the like, may be stopped.

When the voltage value of the low-voltage DC power output by the DC-DC converter 180 is not within the normal range (refer to NO in 620), the motor driving apparatus 1 transmits an error message to the main control circuit (not shown) of the household appliance (670).

Specifically, the main controller 210 of the motor driving apparatus 1 may transmit a power failure message to the main control circuit (not shown) of the household appliance (not shown) so that the household appliance (not shown) may display a failure message of the power circuit 100.

When the voltage value of the low-voltage DC power output by the DC-DC converter 180 is within a normal range (refer to YES in 620), the motor driving apparatus 1 ends initial charging of the first DC link 140 (630).

Specifically, when a predetermined initial charging time has elapsed after the initial charging is started, the main controller 210 of the control circuit 200 generates a second initial charging signal IRP2 for ending the initial charging of the first DC link 140, and transmits the second initial charging signal IRP2 to the inrush circuit 141 of the power circuit 100.

In response to the second initial charging signal IRP2, the switch Q141 of the inrush circuit 141 gets turned on, and DC power rectified by the first rectifier 120 is supplied through the power-factor corrector 130 to the first DC link 140.

Subsequently, the motor driving apparatus 1 determines whether a voltage value of high-voltage DC power output by the first DC link 140 is within a normal range (640).

The first DC link 140 of the power circuit 100 outputs high-voltage DC power LV. The high-voltage sensor 150 of the power circuit 100 may measure a voltage value of the high-voltage DC power LV, and output a high-voltage detection signal HVD corresponding to the measured voltage value.

In addition, the multiplexer 211 of the control circuit 200 may provide the high-voltage detection signal HVD to the main controller 210 in response to the selection signals Sel1, Sel2, and Sel3 of the main controller 210.

For example, when the selection signals Sel1, Sel2, and Sel3 are [1, 1, 1], the multiplexer 211 outputs the high-voltage detection signal HVD to the main controller 210. In this case, when the selection signals Sel1, Sel2, and Sel3 are [1, 1, 1], it may indicate that the main controller 210 outputs 5 V, 5 V, and 5 V as the selection signals Sel1, Sel2, and Sel3.

In other words, after the initial charging is ended, the main controller 210 may determine whether a voltage of the high-voltage DC power output by the first DC link 140 is within a predetermined normal voltage range based on the high-voltage detection signal HVD.

When a voltage value of the high-voltage DC power output by the first DC link 140 is not within the normal voltage range (refer to NO in 640), the motor driving apparatus 1 transmits an error message to the main control circuit (not shown) of the household appliance (670).

Specifically, the main controller 210 of the motor driving apparatus 1 may transmit a power failure message to the main control circuit (not shown) of the household appliance (not shown) so that the household appliance (not shown) may display a failure message of the power circuit 100.

When the voltage value of the high-voltage DC power output by the first DC link 140 is within the normal range (refer to YES in 640), the motor driving apparatus 1 determines whether the inverter circuit 300 is connected to the control circuit 200 and the power circuit 100 (650).

The power circuit 100 may be mounted on a main board MB, the control circuit 200 may be mounted on a first card CA1, and the inverter circuit 300 may be mounted on a second card CA2. When the first card CA1 is inserted into a first slot SL1 of the main board MB and the second card CA2 is inserted into a second slot SL2 of the main board MB, each of the control circuit 200 and the inverter circuit 300 may be connected to the power circuit 100, and the control circuit 200 may be connected to the inverter circuit 300.

In other words, when the control circuit 200 is electrically connected to the inverter circuit 300, the motor driving apparatus 1 may determine that the first card CA1 and the second card CA2 are inserted into the first slot SL1 and the second slot SL2 of the main board MB, respectively.

Accordingly, to determine whether the first card CA1 and the second card CA2 are inserted into the first slot SL1 and the second slot SL2 of the main board MB, the main controller 210 of the motor driving apparatus 1 may determine whether the control circuit 200 is electrically connected to the inverter circuit 300.

In order to determine whether the control circuit 200 is electrically connected to the inverter circuit 300, as shown in FIGS. 19A and 19B, a third detection line SD3_LINE is provided between the control circuit 200 and the inverter circuit 300. One end of the third detection line SD3_LINE may be connected to the main controller 210 of the control circuit 200 and connected to a 5V low-voltage power source through a pull-up resistor Rpu. Further, another end of the third detection line SD3_LINE may be connected to a ground GND of the inverter circuit 300.

As shown in FIG. 19A, when the second card CA2 on which the inverter circuit 300 is mounted is inserted into the main board MB, a voltage of 0 V is applied to the main controller 210.

In addition, as shown in FIG. 19B, when the second card CA2 is not inserted into the main board MB, a voltage of 5 V may be applied to the main controller 210 by the pull-up resistor Rpu.

Accordingly, the main controller 210 may determine whether the inverter circuit 300 is connected to the control circuit 200 and the power circuit 100 based on a signal input through the third detection line SD3_LINE. Further, the main controller 210 may determine whether the second card CA2 on which the inverter circuit 300 is mounted is connected to the main board MB on which the power circuit 100 is mounted.

When the inverter circuit 300 is not connected to the control circuit 200 and the power circuit 100 (refer to NO in 650), the motor driving apparatus 1 transmits an error message to the main control circuit (not shown) of the household appliance (670).

Specifically, when the voltage of 5 V is input through the third detection line SD3_LINE, the main controller 210 may transmit a message indicating that the inverter is uninserted to the main control circuit (not shown) of the household appliance (not shown) so that the household appliance (not shown) may display a message indicating that the second card CA2 is uninserted.

When the inverter circuit 300 is connected to the control circuit 200 and the power circuit 100 (refer to YES in 650), the motor driving apparatus 1 determines whether the auxiliary storage unit 340 of the inverter circuit 300 is operating normally (660).

The auxiliary storage unit 340 of the inverter circuit 300 may store various motor parameters related to the motor 400 driven by the inverter circuit 300. For example, the auxiliary storage unit 340 may store motor parameters, such as a resistance of a wound wire included in the motor 400, an inductance of a wire-wound coil, and a magnetic flux of a permanent magnet of the rotor (not shown) included in the motor 400.

In addition, the auxiliary storage unit 340 may transmit motor parameters to the control circuit 200 through a data bus BUS or receive motor parameters from the control circuit 200 through the data bus BUS. In other words, the auxiliary storage unit 340 may communicate with the control circuit 200 through the data bus BUS.

The main controller 210 of the control circuit 200 may determine, through the data bus BUS, whether the auxiliary storage unit 340 is operating normally.

For example, as shown in FIGS. 20A and 20B, the main controller 210 may transmit an identification information request IDEN_REQ of the inverter circuit 300 to the auxiliary storage unit 340 of the inverter circuit 300 through the data bus BUS, and determine whether the auxiliary storage unit 340 of the inverter circuit 300 is operating normally in response to the inverter circuit 300.

Specifically, as shown in FIG. 20A, when the auxiliary storage unit 340 of the inverter circuit 300 transmits identification information IDEN_DATA within a predetermined response time T1 in response to the identification information request IDEN_REQ of the main controller 210, the main controller 210 may determine that the auxiliary storage unit 340 of the inverter circuit 300 is operating normally.

However, as shown in FIG. 20B, when the auxiliary storage unit 340 of the inverter circuit 300 does not transmit the identification information IDEN_DATA within the predetermined response time T1 in response to the identification information request IDEN_REQ of the main controller 210, the main controller 210 may determine that the auxiliary storage unit 340 of the inverter circuit 300 is not operating normally.

When the auxiliary storage unit 340 of the inverter circuit 300 is not operating normally (refer to NO in 660), the motor driving apparatus 1 transmits an error message to a main control circuit (not shown) of the household appliance (670).

Specifically, when the identification information IDEN_DATA is not received within the response time T1 after the identification information request IDEN_REQ is transmitted, the main controller 210 may transmit an inverter failure message to the main control circuit (not shown) of the household appliance (not shown) so that the household appliance (not shown) may display a failure in the inverter circuit 300.

When the auxiliary storage unit 340 of the inverter circuit 300 is operating normally (YES in 660), the motor driving apparatus 1 ends the initial operation (600).

As described above, when power is supplied from the external power source ES, the motor driving apparatus 1 may check whether the power circuit 100, the control circuit 200, and the inverter circuit 300 is operating normally.

FIG. 21 illustrates an update operation of a motor driving apparatus according to an exemplary embodiment. FIG. 22 illustrates the replacement of an inverter circuit of the motor driving apparatus, according to an exemplary embodiment. FIG. 23 illustrates the replacement of a control circuit of the motor driving apparatus, according to an exemplary embodiment.

An operation 700 of updating a motor parameter when a first card CA1 or a second card CA2 is replaced will be described with reference to FIGS. 21 to 23.

The control circuit 200 requests a motor parameter from the inverter circuit 300 (710).

Specifically, a main controller 210 of the control circuit 200 may transmit a motor parameter read request to an auxiliary storage unit 340 of the inverter circuit 300 through a data bus BUS.

In response to the motor parameter read request of the main controller 210, the auxiliary storage unit 340 may transmit a motor parameter stored in a memory 342 through the data bus BUS to the main controller 210.

Thereafter, the control circuit 200 determines whether the motor parameter received from the inverter circuit 300 is identical with the motor parameter stored in the control circuit 200 (720).

Specifically, the main controller 210 of the control circuit 200 reads a parameter from the main storage unit 240, and compares a motor parameter received from the auxiliary storage unit 340 of the inverter circuit 300 with a motor parameter read from the main storage unit 240.

When the motor parameter received from the auxiliary storage unit 340 of the inverter circuit 300 is identical with the motor parameter read from the main storage unit 240 (YES in 720), the control circuit 200 may end the operation 700 of updating the motor parameter.

When the motor parameter received from the auxiliary storage unit 340 of the inverter circuit 300 is not identical with the motor parameter read from the main storage unit 240 (NO in 720), the control circuit 200 may update the motor parameter stored in the main storage unit 240 (730).

When the motor driving apparatus 1 is manufactured, the same motor parameters are stored in the main storage unit 240 of the control circuit 200 and the auxiliary storage unit 340 of the inverter circuit 300. That is, unless there are special circumstances, the motor parameters stored in the main storage unit 240 of the control circuit 200 are identical with the motor parameters stored in the auxiliary storage unit 340 of the inverter circuit 300.

However, as shown in FIG. 22, when the second card CA2 on which the inverter circuit 300 is mounted is replaced, new motor parameters may be stored in the auxiliary storage unit 340 of the inverter circuit 300.

For example, when the inverter circuit 300 is replaced along with the motor 400, motor parameters of a new motor 400 may be stored in the auxiliary storage unit 340 of the inverter circuit 300.

Further, when only the inverter circuit 300 is replaced, new motor parameters corresponding to the existing motor 400 may be stored in the auxiliary storage unit 340 of the inverter circuit 300. That is, motor parameters of the existing motor 400 may be updated.

As described above, when the second card CA2 on which the inverter circuit 300 is mounted is replaced, the motor parameters stored in the main storage unit 240 of the control circuit 200 may not be identical with the motor parameters stored in the auxiliary storage unit 340 of the inverter circuit 300.

In addition, as shown in FIG. 23, when the first card CA1 on which the control circuit 200 is mounted is replaced, motor parameters may not be stored in the main storage unit 240 of the control circuit 200. This is due to the fact that the control circuit 200 cannot determine being to control the inverter circuit 300 driving which motor 400.

As described above, when the first card CA1 on which the control circuit 200 is mounted is replaced, the motor parameters stored in the main storage unit 240 of the control circuit 200 may not be identical with the motor parameters stored in the auxiliary storage unit 340 of the inverter circuit 300.

For the above-described reason, when the motor parameters stored in the main storage unit 240 of the control circuit 200 is not identical with the motor parameters stored in the auxiliary storage unit 340 of the inverter circuit 300, the control circuit 200 updates the motor parameters stored in the main storage unit 240. In other words, the control circuit 200 deletes the motor parameters stored in the main storage unit 240 and stores motor parameters received from the auxiliary storage unit 340 of the inverter circuit 300.

Subsequently, the control circuit 200 selects a motor control program (740).

The main controller 210 of the control circuit 200 may select any one of a plurality of motor control programs stored in the main storage unit 240 based on the updated motor parameters.

For example, the main controller 210 may determine the type of the motor 400 based on the updated motor parameters. In other words, the main controller 210 may determine whether the motor 400 is a permanent magnet synchronous motor including a permanent magnet or an induction motor using electromagnetic induction. Further, the main controller 210 may select a motor control program appropriate for the type of the motor 400.

Afterwards, the control circuit 200 may track the motor parameters (750).

The main controller 210 of the control circuit 200 applies the motor parameters to a selected motor control program and virtually executes the motor control program. Further, the control circuit 200 may determine, by using a parameter tracking function, whether the selected motor control program is a program appropriate for the motor 400.

Thereafter, the control circuit 200 determines whether a motor control program appropriate for the motor parameter has been selected (760).

When the motor control program is executed without an error after the motor control program is executed by applying the motor parameters to the selected motor control program, the main controller 210 of the control circuit 200 may determine that a motor control program appropriate for the motor parameter has been selected.

However, when an error is detected during the execution of the motor control program after the motor control program is executed by applying the motor parameters to the selected motor control program, the main controller 210 of the control circuit 200 may determine that a motor control program inappropriate for the motor parameter has been selected.

When a motor control program appropriate for the motor parameter has not selected (NO in 760), the control circuit 200 may repeat the operation (740) of selecting a motor control program and the operation (750) of tracking the motor parameters.

When a motor control program appropriate for the motor parameter has been selected (YES in 760), the control circuit 200 may end the operation (700) of updating the motor parameters.

As described above, when the control circuit 200 or the inverter circuit 300 is replaced, the control circuit 200 may update the motor parameters and select a new motor control program.

The motor driving apparatus 1 including one inverter circuit 300 configured to drive one motor 400 has been described thus far.

However, a motor driving apparatus may include at least two inverter circuits 300 configured to drive at least two motors 400.

FIG. 24 illustrates a motor driving apparatus according to another exemplary embodiment. FIG. 25 illustrates an example of a motor driving apparatus according to another exemplary embodiment.

Referring to FIGS. 24 and 25, a motor driving apparatus 1000 includes a plurality of inverter circuits 1300-1, 1300-2, . . . , and 1300-n configured to supply driving power DV to a plurality of motors 1400-1, 1400-2, . . . and 1400-n, a control circuit 200 configured to control the plurality of inverter circuits 1300-1, 1300-2, . . . , and 1300-n, and a power circuit 1100 configured to supply power to the plurality of inverter circuits 1300-1, 1300-2, . . . , and 1300-n and the control circuit 200. Here, n denotes the number of the plurality of inverter circuits 1300-1, 1300-2, . . . , and 1300-n and is a natural number.

The power circuit 1100 may receive power from an external power source ES, supply high-voltage power HV and first to sixth low-voltage powers LV1, LV2, . . . , and LV6 to the plurality of inverter circuits 1300-1, 1300-2, . . . , and 1300-n, and supply seventh low-voltage power LV7 to a control circuit 1200. Further, the power circuit 1100 may provide first sensing data SD1 related to an output voltage of the power circuit 1100 to the control circuit 1200.

The plurality of inverter circuits 1300-1, 1300-2, . . . , and 1300-n receive the high-voltage power HV and the first to sixth low-voltage powers LV1 to LV6 from the power circuit 1100. Further, the plurality of inverter circuits 1300-1, 1300-2, . . . , and 1300-n convert the high-voltage power HV into the driving power DV based on a pulse-width modulation signal PWM supplied from the control circuit 1200, and respectively output the converted driving power DV to the plurality of motors 1400-1, 1400-2, . . . , and 1400-n.

The control circuit 1200 may receive the seventh low-voltage power LV7 from the power circuit 1100, generate a plurality of pulse-width modulation signals PWM for controlling the plurality of motors 1400-1, 1400-2, . . . , and 1400-n, and respectively transmit the plurality of pulse-width modulation signals PWM to the plurality of inverter circuits 1300-1, 1300-2, . . . , and 1300-n.

Furthermore, the control circuit 1200 may exchange data with the plurality of inverter circuits 1300-1, 1300-2, . . . , and 1300-n through a data bus BUS. Specifically, the control circuit 1200 may transmit first memory data MD1 to any one of the plurality of inverter circuits 1300-1, 1300-2, . . . , and 1300-n through the data bus BUS, and receive second memory data MD2 from any one of the plurality of inverter circuits 1300-1, 1300-2, . . . , and 1300-n.

The above-described power circuit 1100, control circuit 1200, and the plurality of inverter circuits 1300-1, 1300-2, . . . , and 1300-n may be respectively mounted on separate printed circuit boards (PCBs). The power circuit 1100, the control circuit 1200, and the plurality of inverter circuits 1300-1, 1300-2, . . . , and 1300-n may be connected to one another through connectors.

For example, as shown in FIG. 25, the power circuit 1100, the control circuit 1200, and the plurality of inverter circuits 1300-1, 1300-2, . . . , and 1300-n may be mounted on a main board MB, a first card CA1, and second to m-th cards CA2 to CAm, respectively. Here, each of the main board MB, the first card CA1, and the second to m-th cards CA2 to CAm may be implemented as a PCB, and m is a 'natural number' increasing in increments of 1.

The main board MB may include a first slot SL1 and second to m-th slots SL2 to SLm, which are electrically connected to the first card CA1 and the second to m-th cards CA2 to CAm, respectively.

Further, the first card CA1 and the second to m-th cards CA2 to CAm may be inserted into the first slot SL1 and the second to m-th slots SL2 to SLm of the main board MB, respectively. When the first card CA1 and the second to m-th cards CA2 to CAm are inserted into the first slot SL1 and the second to m-th slots SL2 to SLm of the main board MB, respectively, the control circuit 1200 and the plurality of inverter circuits 1300-1, 1300-2, . . . , and 1300-n may be electrically connected to the power circuit 1100.

In addition, when the first card CA1 and the second card CA2 to the m-th card CAm are inserted into the first slot SL1 and the second slot SL2 to m-th slot SLm of the main board MB, respectively, the control circuit 1200 may be electrically connected to the plurality of inverter circuits 1300-1, 1300-2, . . . , and 1300-n.

As described above, the motor driving apparatus 1000 may include the power circuit 1100, the control circuit 1200, and the plurality of inverter circuits 1300-1, 1300-2, . . . , and 1300-n. The power circuit 1100, the control circuit 1200, and the plurality of inverter circuits 1300-1, 1300-2, . . . , and 1300-n may be mounted on separate PCBs MB, CA1, CA2, . . . , and CAm, respectively.

Further, the each of the PCBs MB, CA1, CA2, . . . , and CAm may be combined with one another or separate from one another. Specifically, each of the first card CA1 and the second to m-th cards CA2 to CAm may be attached to or detached from the main board MB.

The power circuit 1100, the control circuit 1200, and the plurality of inverter circuits 1300-1, 1300-2, . . . , and 1300-n, which are included in the motor driving apparatus 1000 according to another exemplary embodiment, have the same configuration and functions as the power circuit (refer to 100 in FIG. 1), the control circuit (refer to 200 in FIG. 1), and the inverter circuit (refer to 300 in FIG. 1) included in the motor driving apparatus (refer to 1 in FIG. 1) according to the above-described embodiment.

Specifically, configuration and functions of the power circuit 1100 are the same as those of the power circuit (refer to 100 in FIG. 1), and configuration and functions of the control circuit 1200 are the same as those of the control circuit (refer to 200 in FIG. 1). Further, configuration and functions of each of the plurality of inverter circuits 1300-1, 1300-2, ..., and 1300-n are the same as those of the inverter circuit (refer to 300 in FIG. 1).

In addition, the control circuit 1200 may perform the initial operation (refer to 600 in FIG. 15) described with reference to FIGS. 15 to 20B and the updating operation (refer to 700 in FIG. 21) described with reference to FIGS. 21 to 23.

As described above, the motor driving apparatus 1000 may include a plurality of inverter circuits 1300-1, 1300-2, ..., and 1300-n. The power circuit 1100 may supply DC power to each of the plurality of inverter circuits 1300-1, 1300-2, ..., and 1300-n, and the control circuit 1200 may independently control the respective inverter circuits 1300-1, 1300-2, ..., and 1300-n.

In particular, the plurality of inverter circuits 1300-1, 1300-2, ..., and 1300-n may be respectively mounted on separate PCBs. The PCBs on which the plurality of inverter circuits 1300-1, 1300-2, ..., and 1300-n are mounted may be fixed to the PCB on which the power circuit 1100 is mounted and separate from the PCB on which the power circuit 1100 is mounted.

Hereinafter, a household appliance in which a motor driving apparatus is installed will be described.

FIG. 26 illustrates configuration of a refrigerator including a motor driving apparatus according to an exemplary embodiment.

As shown in FIG. 26, a refrigerator 2000 includes a main body in which a freezing compartment 2001 and a refrigeration compartment 2002 are formed. The main body may include a first cooling apparatus 2200-1 configured to supply cool air to the freezing compartment 2001, a second cooling apparatus 2200-2 configured to supply cool air to the refrigeration compartment 2002, a motor driving apparatus 1000 configured to drive the first and second cooling apparatuses 2200-1 and 2200-2, and a main control circuit 2100 configured to control the motor driving apparatus 1000.

The first cooling apparatus 2200-1 may include a first compressor 2210-1 configured to compress a refrigerant, a first condenser 2220-1 configured to condense the compressed refrigerant, a first expander 2230-1 configured to decompress the condensed refrigerant, and a first evaporator 2240-1 configured to evaporate the expanded refrigerant. The first evaporator 2240-1 is provided in the freezing compartment 2001 and may cool the freezing compartment 2001 due to the refrigerant absorbing latent heat while the refrigerant evaporates.

Further, the first compressor 2210-1 includes a first motor 2211-1 configured to generate rotational force and compresses a refrigerant by using the first motor 2211-1.

The second cooling apparatus 2200-2 may include a second compressor 2210-2 configured to compress the refrigerant, a second condenser 2220-2 configured to condense the compressed refrigerant, a second expander 2230-2 configured to decompress the condensed refrigerant, and a second evaporator 2240-2 configured to evaporate the expanded refrigerant. The second evaporator 2240-2 is provided in the refrigeration compartment 2002 and may cool the freezing compartment 2002 due to the refrigerant absorbing latent heat while the refrigerant evaporates.

In addition, the second compressor 2210-2 includes a second motor 2211-2 configured to generate rotational force and compresses the refrigerant by using the second motor 2211-2.

The motor driving apparatus 1000 may include a first inverter circuit 1300-1 configured to supply driving power to the first motor 2211-1, a second inverter circuit 1300-2 configured to supply driving power to the second motor 2211-1, a control circuit 1200 configured to control the first and second inverter circuits 1300-1 and 1300-2, and a power circuit 1100 configured to supply DC power to the first and second inverter circuits 1300-1 and 1300-2 and the control circuit 1200.

The first and second inverter circuits 1300-1 and 1300-2, the control circuit 1200, and the power circuit 1100 may be respectively mounted on separate PCBs. For example, the power circuit 1100 may be mounted on a main board, the control circuit 1200 may be mounted on a first card, and the first and second inverter circuits 1300-1 and 1300-2 may be mounted on a second card and a third card, respectively. Further, the first, second, and third cards may be inserted into the main board.

In addition, the main control circuit 2100 may transmit a control command to the motor driving apparatus 1000 so that the first cooling apparatus 2200-1 or the second cooling apparatus 2200-2 generates cool air according to temperatures of the freezing compartment 2001 and the refrigeration compartment 2002. The control command output by the main control circuit 2100 may include whether the first and second motors 2211-1 and 2211-2 are driven and target speeds of the first and second motors 2211-1 and 2211-2.

As described above, the first and second inverter circuits 1300-1 and 1300-2, the control circuit 1200, and the power circuit 1100 may be respectively mounted on separate PCBs, thereby facilitating maintenance and repair of the first and second inverter circuits 1300-1 and 1300-2, the control circuit 1200, and the power circuit 1100.

FIG. 27 illustrates configuration of an air conditioner including a motor driving apparatus according to an exemplary embodiment.

As shown in FIG. 27, an air conditioner 3000 includes an indoor unit 3001 configured to perform heat exchange indoors and an outdoor unit 3002 configured to perform heat exchange outdoors. Further, the air conditioner 3000 may include a heat exchange apparatus 3200 configured to perform heat exchange indoors and outdoors, a motor driving apparatus 1000 configured to drive the heat exchange apparatus 3200, and a main control circuit 3100 configured to control the motor driving apparatus 1000.

The heat exchange apparatus 3200 includes a compressor 3210 configured to compress a refrigerant, an outdoor heat exchanger 3220 configured to perform heat exchange between the refrigerant and outdoor air, an expander 3230 configured to decompress the refrigerant, an indoor heat exchanger 3240 configured to perform heat exchange between the refrigerant and the indoor air, and a blowing fan 3250 configured to facilitate heat exchange of the outdoor heat exchanger 3220.

In a cooling cycle, the outdoor heat exchanger 3220 condenses the refrigerant compressed by the compressor 3210, and the indoor heat exchanger 3240 evaporates the refrigerant decompressed by the expander 3230. In this case, the indoor heat exchanger 3240 may cool indoor air due to the refrigerant absorbing latent heat while the refrigerant evaporates.

In a heating cycle, the outdoor heat exchanger 3220 evaporates the refrigerant decompressed by the expander 3230, and the indoor heat exchanger 3240 condenses the refrigerant compressed by the compressor 3210. In this case, the indoor heat exchanger 3240 may heat indoor air due to the refrigerant emitting latent heat while the refrigerant condenses.

In addition, the compressor 3210 includes a first motor 3211 configured to generate rotational force and compresses a refrigerant by using the rotational force of the first motor 3211. Further, the blowing fan 3250 includes a second motor 3251 configured to generate rotational force and send air to the outdoor heat exchanger 3220 by using the rotational force of the second motor 3251.

The motor driving apparatus 1000 may include a first inverter circuit 1300-1 configured to supply driving power to the first motor 3211, a second inverter circuit 1300-2 configured to supply driving power to the second motor 3251, a control circuit 1200 configured to control the first and second inverter circuits 1300-1 and 1300-2, and a power circuit 1100 configured to supply DC power to the first and second inverter circuits 1300-1 and 1300-2 and the control circuit 1200.

The first and second inverter circuits 1300-1 and 1300-2, the control circuit 1200, and the power circuit 1100 may be respectively mounted on separate PCBs. For example, the power circuit 1100 may be mounted on a main board, the control circuit 1200 may be mounted on a first card, and the first and second inverter circuits 1300-1 and 1300-2 may be mounted on a second card and a third card, respectively. Further, the first, second, and third cards may be inserted into the main board.

In addition, the main control circuit 3100 may transmit a control command to the motor driving apparatus 1000 according to an indoor temperature. The control command output by the main control circuit 3100 may include whether the first and second motors 3211 and 3251 are driven and target speeds of the first and second motors 3211 and 3251.

As described above, the first and second inverter circuits 1300-1 and 1300-2, the control circuit 1200, and the power circuit 1100 may be respectively mounted on separate PCBs, thereby facilitating maintenance and repair of the first and second inverter circuits 1300-1 and 1300-2, the control circuit 1200, and the power circuit 1100.

While the present invention has been particularly shown and described with reference to exemplary embodiments thereof, it should be understood that the invention is not limited to the above-described specific exemplary embodiments, but various modifications may be made by those skilled in the art without departing from the spirit and scope of the invention and cannot be individually understood from the disclosed invention.

The invention claimed is:

1. A motor driving apparatus comprising:
a main board;
a first card
a second card;
an inverter circuit configured to supply a driving current to a motor;
a control circuit configured to control the inverter circuit; and
a power circuit configured to supply direct-current (DC) power to at least one of the inverter circuit and the control circuit, wherein
one of the inverter circuit, the control circuit and the power circuit is mounted on the main board,
the others of the inverter circuit, the control circuit and the power circuit are mounted on the first card and the second card, respectively, or on the second card and the first card, respectively, and
the first card and the second card are electrically connectable to, and detachable from, the main board so that, when the first card and the second card are electrically connected to the main board,
the inverter circuit and the power circuit are electrically connected to each other,
the control circuit and the power circuit are electrically connected to each other, and
the control circuit and the inverter circuit are electrically connected to each other.

2. The apparatus according to claim 1, wherein the inverter circuit comprises:
an inverter configured to convert DC power supplied from the power circuit into alternating-current (AC) power and supply the converted AC power to the motor;
an auxiliary storage unit configured to store parameters of the motor; and
a first communication interface configured to communicate with the control circuit.

3. The apparatus according to claim 2, wherein the control circuit comprises:
a main storage unit configured to store parameters of the motor;
a second communication interface configured to communicate with the inverter circuit; and
a main controller configured to manage the parameters stored in the main storage unit.

4. The apparatus according to claim 3, wherein the main controller updates the parameters stored in the main storage unit based on the parameters stored in the auxiliary storage unit.

5. The apparatus according to claim 4, wherein the main controller receives the parameters from the auxiliary storage unit through the second communication interface and updates the parameters stored in the main storage unit based on the received parameters when the received parameters are different from the parameters stored in the main storage unit.

6. The apparatus according to claim 3, wherein
the main board, the first card or the second card on which the power circuit is mounted includes a data bus configured to connect the first communication interface to the second communication interface.

7. The apparatus according to claim 3, wherein
the main board, the first card or the second card on which the power circuit is mounted includes a connection detection line configured to couple the inverter circuit to the control circuit, and
one end of the connection detection line is coupled to a ground of the inverter circuit, and another end of the connection detection line is coupled to the main controller.

8. The apparatus according to claim 7, wherein
the main controller determines whether the main board, the first card or the second card on which the control circuit is mounted is electrically connected to the main board, the first card or the second card on which the power circuit is mounted, based on a signal of the connection detection line.

9. The apparatus according to claim 3, wherein the control circuit further comprises an inverter controller configured to control the inverter included in the inverter circuit.

10. The apparatus according to claim 1, wherein the power circuit comprises:
a high-voltage power circuit configured to supply high-voltage DC power to the inverter circuit;

a high-voltage sensor configured to measure a voltage value of the high-voltage DC power and output a high-voltage detection signal corresponding to the voltage value of the high-voltage DC power;

a low-voltage power circuit configured to supply low-voltage DC power to the inverter circuit and the control circuit; and a low-voltage sensor configured to measure a voltage value of the low-voltage DC power and output a low-voltage detection signal corresponding to the voltage value of the high-voltage DC power.

11. The apparatus according to claim 10, wherein the control circuit comprises:

a multiplexer configured to multiplex the high-voltage detection signal and the low-voltage detection signal; and a main controller configured to receive at least one of the high-voltage detection signal and the low-voltage detection signal from the multiplexer.

12. The apparatus according to claim 11, wherein the main controller outputs a selection signal for selecting at least one of the high-voltage detection signal and the low-voltage detection signal to the multiplexer, and the multiplexer outputs at least one of the high-voltage detection signal and the low-voltage detection signal to the main controller based on the selection signal.

13. The apparatus according to claim 11, wherein the main controller warns of a failure in the power circuit when a voltage value of the at least one of the high-voltage detection signal and the low-voltage detection signal deviates from a predetermined voltage range.

14. The apparatus according to claim 11, wherein the main controller stops operation of the power circuit when a voltage value of the at least one of the high-voltage detection signal and the low-voltage detection signal deviates from a predetermined voltage range.

15. A method of controlling a motor driving apparatus including an inverter circuit configured to drive a motor and a control circuit configured to control the inverter circuit, the method comprising:

transmitting a first motor parameter stored in an auxiliary storage included in the inverter circuit to the control circuit;

comparing the first motor parameter with a second motor parameter stored in a main storage included in the control circuit; and storing the first motor parameter in the main storage unit when the first motor parameter is different from the second motor parameter.

16. A motor driving apparatus comprising:

an inverter circuit configured to supply a driving current to a motor;

a control circuit configured to control the inverter circuit; and a power circuit configured to supply direct-current (DC) power to at least one of the inverter circuit and the control circuit, wherein the inverter circuit comprises:

an inverter configured to convert DC power supplied from the power circuit into alternating-current (AC) power and supply the converted AC power to the motor, an auxiliary storage unit configured to store parameters of the motor, and a first communication interface configured to communicate with the control circuit, the control circuit comprises:

a main storage unit configured to store parameters of the motor, a second communication interface configured to communicate with the inverter circuit, and a main controller configured to manage the parameters stored in the main storage unit, the main controller updates the parameters stored in the main storage unit based on the parameters stored in the auxiliary storage unit, and the main controller receives the parameters from the auxiliary storage unit through the second communication interface and updates the parameters stored in the main storage unit based on the received parameters when the received parameters are different from the parameters stored in the main storage unit.

* * * * *

UNITED STATES PATENT AND TRADEMARK OFFICE
CERTIFICATE OF CORRECTION

PATENT NO. : 10,536,058 B2  
APPLICATION NO. : 15/763659  
DATED : January 14, 2020  
INVENTOR(S) : Sun Jin Kim et al.

Page 1 of 1

It is certified that error appears in the above-identified patent and that said Letters Patent is hereby corrected as shown below:

In the Claims

Column 37, Line 55:
In Claim 1, after "first" delete "card" and insert -- card; --, therefor.

Signed and Sealed this
Third Day of March, 2020

Andrei Iancu
*Director of the United States Patent and Trademark Office*